US008681872B2

(12) United States Patent
Sasai et al.

(10) Patent No.: US 8,681,872 B2
(45) Date of Patent: Mar. 25, 2014

(54) VIDEO ENCODING METHOD, AND VIDEO DECODING METHOD

(75) Inventors: Hisao Sasai, Osaka (JP); Satoshi Kondo, Kyoto (JP)

(73) Assignee: Panasonic Corporation, Osaka (JP)

( * ) Notice: Subject to any disclaimer, the term of this patent is extended or adjusted under 35 U.S.C. 154(b) by 110 days.

(21) Appl. No.: 13/429,538

(22) Filed: Mar. 26, 2012

(65) Prior Publication Data

US 2012/0177127 A1    Jul. 12, 2012

Related U.S. Application Data

(62) Division of application No. 11/667,694, filed as application No. PCT/JP2005/020815 on Nov. 14, 2005, now Pat. No. 8,165,212.

(30) Foreign Application Priority Data

Nov. 19, 2004  (JP) .................................. 2004-335368

(51) Int. Cl.
    *H04N 11/04*         (2006.01)
(52) U.S. Cl.
    USPC ............ 375/240.18; 375/240.01; 375/240.02; 375/240.12; 375/240.19; 375/240.2; 375/240.21; 375/E7.129; 375/E7.226; 375/E7.227; 375/E7.243; 380/210; 380/217
(58) Field of Classification Search
    USPC ............ 375/240.01, 240.02, 240.12, 240.19, 375/240.2, 240.21, E7.129, E7.226, 375/E7.227, E7.243; 380/210, 217
    See application file for complete search history.

(56) References Cited

U.S. PATENT DOCUMENTS

| 5,001,561 | A |   | 3/1991  | Haskell |              |
|-----------|---|---|---------|---------|--------------|
| 5,196,930 | A | * | 3/1993  | Kadono et al. | ............. 375/240.2 |
| 5,268,755 | A |   | 12/1993 | Nishino |              |

(Continued)

FOREIGN PATENT DOCUMENTS

| EP | 0 539 833 | 5/1993 |
| EP | 1 763 251 | 3/2007 |

(Continued)

OTHER PUBLICATIONS

Philippe et al. "Encoding of Images Based on a lapped Orthogonal Transform", 1989 IEEE.*

(Continued)

*Primary Examiner* — Taghi Arani
*Assistant Examiner* — Josnel Jeudy
(74) *Attorney, Agent, or Firm* — Wenderoth, Lind & Ponack, L.L.P.

(57) ABSTRACT

Provided is a video coding method and a video decoding method increasing the resolution and quality of images while suppressing an amount of data required for increasing the resolution. A video coding apparatus includes a first orthogonal transformation unit performing discrete cosine transform on an input picture signal, a low-pass filter performing low-pass filtering on the input picture signal, a downsampling unit downsampling the resolution of a low-frequency image signal, a coding unit compressing and coding a reduced image signal, a local decoding unit decoding a coded bit stream, a second orthogonal transformation unit performing discrete cosine transform on a decoded image signal, and a modification information generation unit generating, based on input image DCT coefficients and decoded image DCT coefficients, coefficient modification information used for modifying orthogonal transformation coefficients obtained by performing orthogonal transformation on a decoded video signal obtained from a coded bit stream.

11 Claims, 23 Drawing Sheets

(56) References Cited

U.S. PATENT DOCUMENTS

| | | | |
|---|---|---|---|
| 5,414,469 A | 5/1995 | Gonzales et al. | |
| 5,418,620 A * | 5/1995 | Nishino et al. | 386/337 |
| 5,703,647 A | 12/1997 | Kim | |
| 5,748,903 A | 5/1998 | Agarwal | |
| 5,899,966 A | 5/1999 | Matsumoto | |
| 5,912,706 A | 6/1999 | Kikuchi | |
| 5,970,172 A | 10/1999 | Mochizuki | |
| 6,348,945 B1 | 2/2002 | Hayakawa | |
| 6,788,821 B2 | 9/2004 | Inoue | |
| 7,082,221 B1 | 7/2006 | Jiang | |
| 7,835,438 B2 * | 11/2010 | Chono | 375/240.12 |
| 2003/0099290 A1 | 5/2003 | Chen | |
| 2006/0013310 A1 | 1/2006 | Lee | |
| 2006/0104527 A1 * | 5/2006 | Koto et al. | 382/239 |
| 2006/0126126 A1 | 6/2006 | Kondo et al. | |
| 2007/0160147 A1 | 7/2007 | Kondo et al. | |
| 2010/0329641 A1 * | 12/2010 | Yoshida et al. | 386/269 |

FOREIGN PATENT DOCUMENTS

| | | |
|---|---|---|
| JP | 4/354488 | 12/1992 |
| JP | 5-167999 | 7/1993 |
| JP | 5-236447 | 9/1993 |
| JP | 5-308631 | 11/1993 |
| JP | 6-315143 | 11/1994 |
| JP | 7-95563 | 4/1995 |
| JP | 9-187004 | 7/1997 |
| JP | 2004-056459 | 2/2004 |
| WO | 02/30124 | 4/2002 |
| WO | 02/30348 | 4/2002 |
| WO | 2006/001384 | 1/2006 |

OTHER PUBLICATIONS

International Search Report mailed Jan. 24, 2006 in corresponding PCT Application No. PCT/JP2005/020815.

Supplemental European Search Report issued Jun. 30, 2009 in corresponding European Application No. EP 05 80 6314.

Philippe et al., Encoding of Images Based on a lapped Orthogonal Transform, Feb. 1989, IEEE transactions on Communications, vol. 37, No. 2.

* cited by examiner

FIG. 2A

| A | B | E | F |
|---|---|---|---|
| C | D | G | H |
| I | J | K | L |
| M | N | O | P |

Input image DCT coefficients

FIG. 2B

| a | b |
|---|---|
| c | d |

Decoded image DCT coefficients

FIG. 2C

| A | B | E | F |
|---|---|---|---|
| C | D | G | H |
| I | J | K | L |
| M | N | O | P |

DCT coefficient grouping result

FIG. 2D

| a | b |
|---|---|
| c | d |

DCT coefficient grouping result

FIG. 5A

| Grouping combination of input image DCT coefficients | Number |
|---|---|
| (4×4 block with γ,α / γ,β / γ,γ,γ,α / γ,γ,γ,β) | i1 |
| (4×4 block with γ,α / γ,β / γ,γ,γ,α / γ,γ,γ,β) | i2 |
| ⋮ | ⋮ |

FIG. 5B

| Grouping combination of decoded image DCT coefficients | Number |
|---|---|
| (2×2 block: α,γ / γ,γ) | d1 |
| (2×2 block: γ,β / γ,γ) | d2 |
| ⋮ | ⋮ |

FIG. 5C

Grouping combination numbers of input image DCT coefficients

| Grouping combination numbers of decoded image DCT coefficients | | i1 | i2 | i3 | i4 | ⋯ |
|---|---|---|---|---|---|---|
| | d1 | 0 | 1 | 2 | 3 | |
| | d2 | 1 | 0 | 2 | 3 | |
| | d3 | 3 | 1 | 0 | 2 | |
| | ⋮ | | | | | |

FIG. 5D

Grouping combination numbers of input image DCT coefficients

| Grouping combination numbers of decoded image DCT coefficients | | i1 | i2 | i3 | i4 | ⋯ |
|---|---|---|---|---|---|---|
| | d1 | 0 | 1 | 2 | 3 | |
| | d2 | 1 | 0 | 2 | 3 | |
| | d3 | 3 | 1 | 0 | 2 | |
| | ⋮ | | | | | |

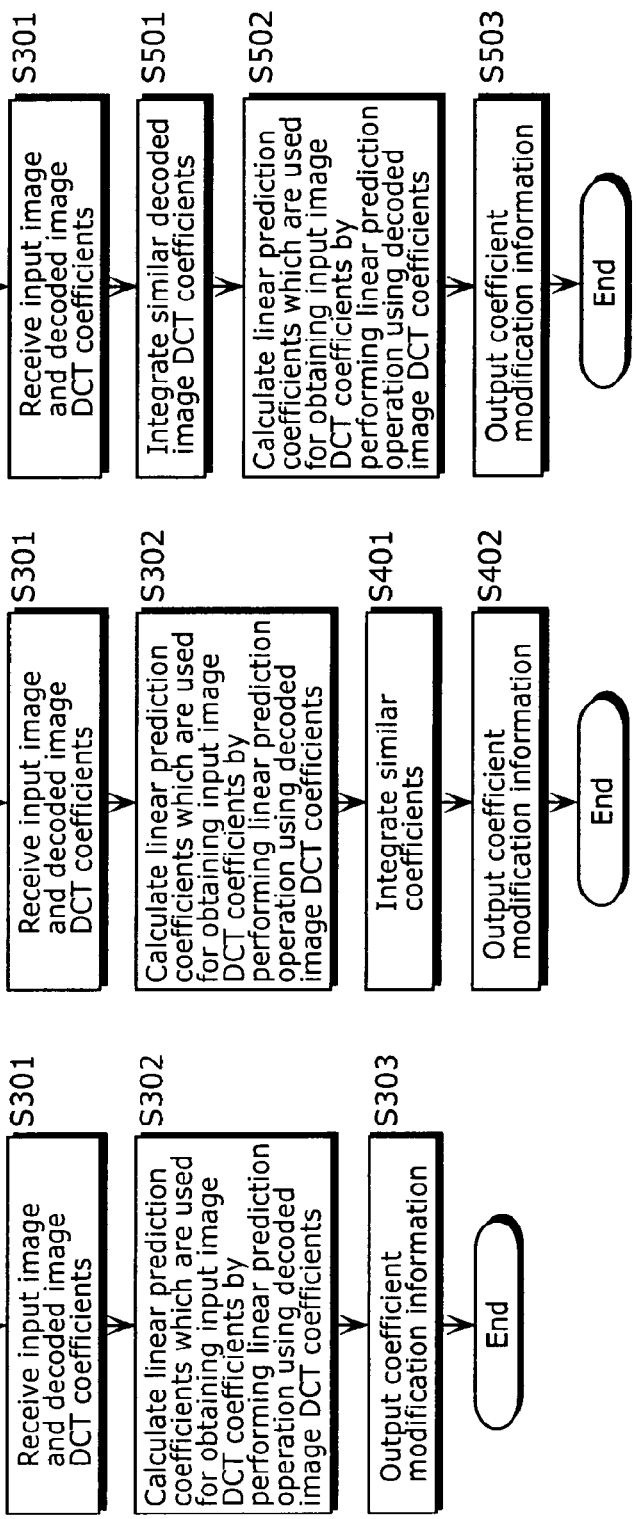

FIG. 8A
Input picture

| 1 | 2 | 3 |
|---|---|---|
| 4 | 5 | 6 |
| 7 | 8 | 9 |

FIG. 8B
Input image DCT coefficients

| A | B | E | F |
|---|---|---|---|
| C | D | G | H |
| I | J | K | L |
| M | N | O | P |

FIG. 8C
DCT coefficients of predetermined area

Decoded image

| 1 | 2 | 3 |
|---|---|---|
| 4 | 5 | 6 |
| 7 | 8 | 9 |

FIG. 9B

| a | b |
|---|---|
| c | d |

Decoded image
DCT coefficients

| $a_1$ | $a_2$ | $a_3$ |   | $b_1$ | $b_2$ | $b_3$ |
|---|---|---|---|---|---|---|
| $a_4$ | $a_5$ | $a_6$ |   | $b_4$ | $b_5$ | $b_6$ |
| $a_7$ | $a_8$ | $a_9$ |   | $b_7$ | $b_8$ | $b_9$ |

| $c_1$ | $c_2$ | $c_3$ |   | $d_1$ | $d_2$ | $d_3$ |
|---|---|---|---|---|---|---|
| $c_4$ | $c_5$ | $c_6$ |   | $d_4$ | $d_5$ | $d_6$ |
| $c_7$ | $c_8$ | $c_9$ |   | $d_7$ | $d_8$ | $d_9$ |

DCT coefficients of
predetermined area

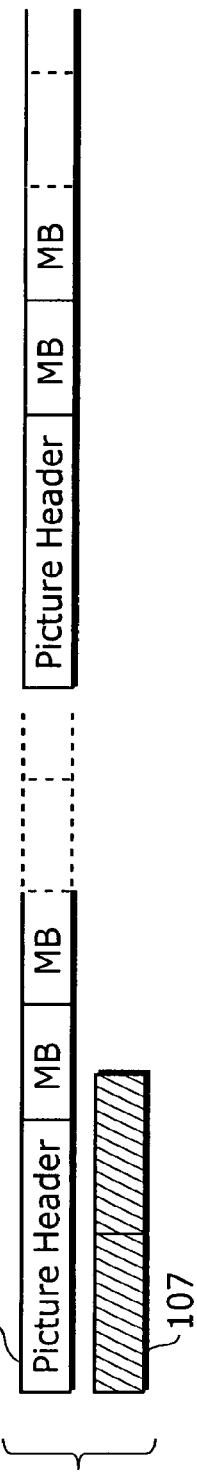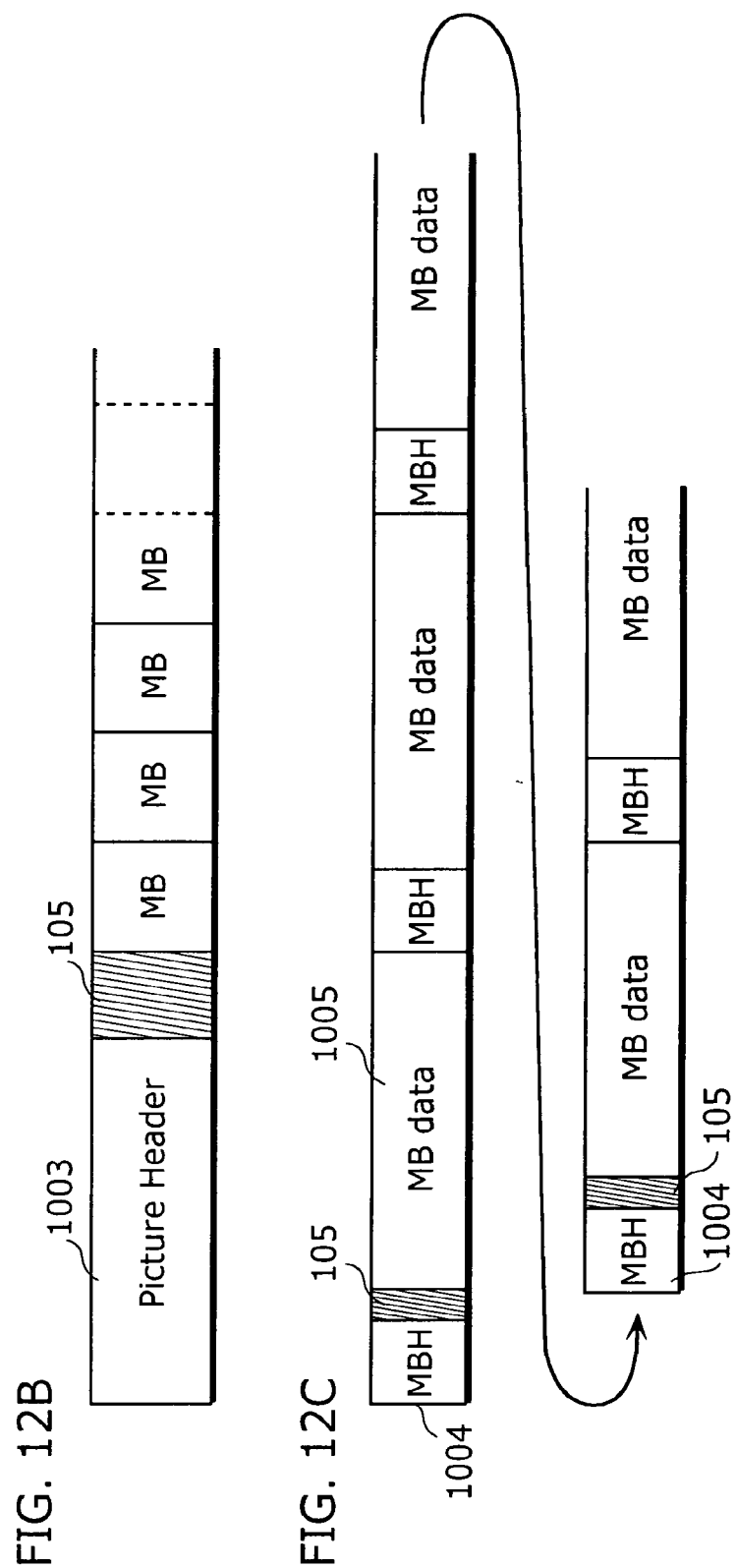
FIG. 12A
FIG. 12B
FIG. 12C

VIDEO ENCODING METHOD, AND VIDEO DECODING METHOD

This application is a divisional of U.S. application Ser. No. 11/667,694 now U.S. Pat. No. 8,165,212, filed May 14, 2007, which is a national stage application of International application No. PCT/JP2005/020815, filed Nov. 14, 2005.

TECHNICAL FIELD

The present invention relates to a video coding method for compressing and coding a video signal, and a video decoding method for decoding a compressed and coded bit stream of the video signal.

BACKGROUND ART

A technique of video coding is known as a technique used in an apparatus, such as a television, a personal computer (PC), a cellular phone or the like, which displays image signals, with the goal of coding a video signal at a low bit rate for transmission. For example, Moving Picture Experts Group (MPEG), which is a set of international standards for compression of video signals, defines formats for compressing and coding video signals, using entropy coding, by creating predicted images and obtaining information regarding creation of such predicted images as well as information regarding orthogonal transformation and quantization of difference information between the predicted images and images to be coded. These MPEG formats are used in the fields of data storage and broadcasting.

The challenge of a new coding standard for higher image quality is to have compatibility with these existing standards. One method for keeping compatibility is an existing decoder capable of decoding a part of a bit stream coded in the new standard format. For example, a method has been suggested in which the resolution of an image is hierarchically divided into a low-resolution image area and a high-resolution image area and an existing standard is applied to the low-resolution area while a new standard is applied to the high-resolution area so as to obtain a reconstructed image (see, for example, Patent Reference 1).

Patent Reference 1: Japanese Laid-Open Patent Application No. 05-308631 Publication

DISCLOSURE OF INVENTION

Problems that Invention is to Solve

However, coding of the information of difference from the high-resolution image, as suggested in the above method, causes a problem that an amount of data required for enhancing the resolution increases.

The present invention has been conceived in view of the above problem, and has an object to provide a video coding method and a video decoding method capable of increasing the resolution and quality of an image while suppressing an amount of data required for increasing the resolution.

Means to Solve the Problems

In order to achieve the above object, the video coding method according to the present invention is a video coding method for compressing and coding a video signal, and this method includes: outputting a coded bit stream obtained by compressing and coding the video signal; generating coefficient modification information used for modifying orthogonal transformation coefficients obtained by performing orthogonal transformation on a decoded video signal obtained from the coded bit stream, based on orthogonal transformation coefficients obtained by performing orthogonal transformation on the video signal; and outputting the coefficient modification information as additional information of the coded bit stream.

With this method, it is possible to increase the resolution and quality of an image while suppressing an amount of data required for increasing the resolution.

Here, the above video coding method may further include generating a low-frequency video signal composed of low-frequency components of the video signal, and the above outputting of the coded bit stream may include outputting the coded bit stream obtained by compressing and coding the low-frequency video signal.

This video coding method may further include generating a reduced image signal of a predetermined decreased-resolution obtained through downsampling the video signal, and the above outputting of the coded bit stream includes outputting the coded bit stream obtained by compressing and coding the reduced image signal.

This video coding method may further include: generating a temporarily decoded image signal by temporarily decoding the coded bit stream; and calculating temporarily decoded orthogonal transformation coefficients by performing orthogonal transformation on the temporarily decoded image signal, and the above generating of the coefficient modification information may include generating the coefficient modification information based on the orthogonal transformation coefficients and the temporarily decoded orthogonal transformation coefficients. By doing so, it is possible to improve the quality of decoded images.

The coefficient modification information is grouping information that indicates to which range of values, out of a predetermined number of ranges of values, each of the orthogonal transformation coefficients belongs, and the above generating of the coefficient modification information may include: determining, based on the temporarily decoded orthogonal transformation coefficients, a threshold value for grouping the orthogonal transformation coefficients into the ranges of values; and generating the grouping information by determining, based on the threshold value, to which range of values each of the orthogonal transformation coefficients belongs.

The coefficient modification information is linear prediction coefficients for predicting the orthogonal transformation coefficients from the temporarily decoded orthogonal transformation coefficients, and the above generating of the coefficient modification information may include generating the coefficient modification information by determining the linear prediction coefficients based on the orthogonal transformation coefficients and the temporarily decoded orthogonal transformation coefficients.

The coefficient modification information is information that indicates correlation between the temporarily decoded orthogonal transformation coefficients and the orthogonal transformation coefficients, and the above generating of the coefficient modification information may include generating the coefficient modification information by calculating correlation levels each between a set of the orthogonal transformation coefficients in each frequency band for plural blocks and a set of temporarily decoded orthogonal transformation coefficients in each frequency band for plural blocks, the block being the unit of the orthogonal transformation.

The video decoding method according to the present invention is a video decoding method for decoding a coded bit stream obtained by compressing and coding a video signal, and this method includes: obtaining, as additional information of the coded bit stream, coefficient modification information used for modifying orthogonal transformation coefficients obtained by performing orthogonal transformation on a decoded video signal obtained from the coded bit stream; generating a first video signal by decoding the coded bit stream; obtaining decoded orthogonal transformation coefficients by performing orthogonal transformation on the first video signal; calculating modified orthogonal transformation coefficients based on the coefficient modification information and the decoded orthogonal transformation coefficients; and outputting a second video signal obtained by performing inverse orthogonal transformation on the modified orthogonal transformation coefficients.

With this method, it is possible to improve the quality of a decoded image signal using a reduced amount of coefficient modification information.

The coefficient modification information is information that indicates to which range of values, out of a predetermined number of ranges of values, each of the orthogonal transformation coefficients belongs, and the above calculating of the modified orthogonal transformation coefficients may include: determining, based on the decoded orthogonal transformation coefficients, a threshold value for grouping the orthogonal transformation coefficients into the ranges of values; and calculating the modified orthogonal transformation coefficients based on the threshold value and the information that indicates to which range of values, out of the predetermined number of ranges of values, each of the orthogonal transformation coefficient belongs.

The coefficient modification information is linear prediction coefficients for predicting orthogonal transformation coefficients to be calculated, and the above calculating of the modified orthogonal transformation coefficients may include calculating the modified orthogonal transformation coefficients from the decoded orthogonal transformation coefficients using the linear prediction coefficients.

The coefficient modification information is information that indicates correlation between a set of orthogonal transformation coefficients to be calculated in each frequency band for plural blocks and a set of the decoded orthogonal transformation coefficients in each frequency band for plural blocks, the block being the unit of the orthogonal transformation, and the above calculating of the modified orthogonal transformation coefficients may include calculating the modified orthogonal transformation coefficients by calculating the set of the orthogonal transformation coefficients in each frequency band for the plural blocks, based on the information that indicates the correlation with the set of the decoded orthogonal transformation coefficients in each frequency band for the plural blocks.

The above calculating of the modified orthogonal transformation coefficients may include calculating, as the modified orthogonal transformation coefficients, an increased number of orthogonal transformation coefficients by generating a predetermined number of unknown orthogonal transformation coefficients from the orthogonal transformation coefficients using the coefficient modification information, and the above outputting of the second video signal may include outputting, as the second video signal, a video signal of a predetermined increased-resolution by performing inverse orthogonal transformation on the modified orthogonal transformation coefficients. By doing so, it is possible to achieve high resolution and high image quality.

Note that it is possible to implement the present invention not only as such a video coding method and a video decoding method, but also as a video coding apparatus and a video decoding apparatus including, as units, the characteristic steps of these video coding method and video decoding method, as well as a program for causing a computer to execute these steps. Furthermore, such a program can be distributed by recording media including CD-ROM and over transmission media including the Internet.

Effects of the Invention

Since the video coding method and the video decoding method according to the present invention can generate a high-quality coded bit stream at a low bit rate, and further increase the resolution and quality of a decoded image at a low bit rate, their practical value is high.

BRIEF DESCRIPTION OF DRAWINGS

FIG. 2A is a diagram showing coefficient values A to P of input image DCT coefficients, FIG. 2B is a diagram showing coefficient values a to d of decoded image DCT coefficients, FIG. 2C is a diagram showing an example of input image DCT coefficients which are grouped into three, and FIG. 2D is a diagram showing an example of decoded image DCT coefficients which are grouped into three.

FIGS. 5A to 5D are diagrams showing examples of tables held by the modification information generation unit, and specifically, FIG. 5A shows a first grouping table; FIG. 5B shows a second grouping table; FIG. 5C shows a code table, and FIG. 5D shows another code table.

FIG. 7A is a schematic diagram showing that input image DCT coefficients are calculated by performing linear prediction operation using decoded image DCT coefficients, and FIGS. 7B, 7C and 7D are flowcharts each showing a sequence of operations performed by the modification information generation unit when it generates coefficient modification information in a modification 2.

FIG. 8A is a diagram showing blocks within a predetermined image area of an input picture, FIG. 8B is a diagram showing coefficient values A to P of input image DCT coefficients of a block, and FIG. 8C is a diagram showing sets of coefficients of each predetermined image area.

FIG. 9A is a diagram showing blocks within a predetermined image area of a decoded image, FIG. 9B is a diagram showing coefficient values a to d of decoded image DCT coefficients of a block, and FIG. 9C is a diagram showing sets of coefficients of each predetermined image area.

FIGS. 12A to 12C are diagrams for explaining how to transmit coefficient modification information, and specifically, FIG. 12A is a diagram showing an example where a coded bit stream of additional information is transmitted separately from a coded bit stream of picture data; FIG. 12B is a diagram showing an example where additional information is inserted into the picture header of a coded bit stream; and FIG. 12C is a diagram showing an example where additional information is inserted into the macroblock header of a coded bit stream.

FIG. 15A shows an example where resolution conversion is not performed; FIG. 15B shows an example where resolution conversion is performed without information for modifying decoded image DCT coefficients being included in coefficient modification information; and FIG. 15C shows an example where resolution conversion is performed with information for modifying decoded image DCT coefficients being included in coefficient modification information.

FIG. 19A is an illustration showing an example of a physical format of a flexible disk as the main unit of the recording medium, FIG. 19B is a an illustration showing a front view of the appearance of a flexible disk, a cross-sectional view of the flexible disk and the flexible disk itself, and FIG. 19C is an illustration showing a configuration for recording and reproducing the above program on and from the flexible disk FD.

NUMERICAL REFERENCES

Figure 1:
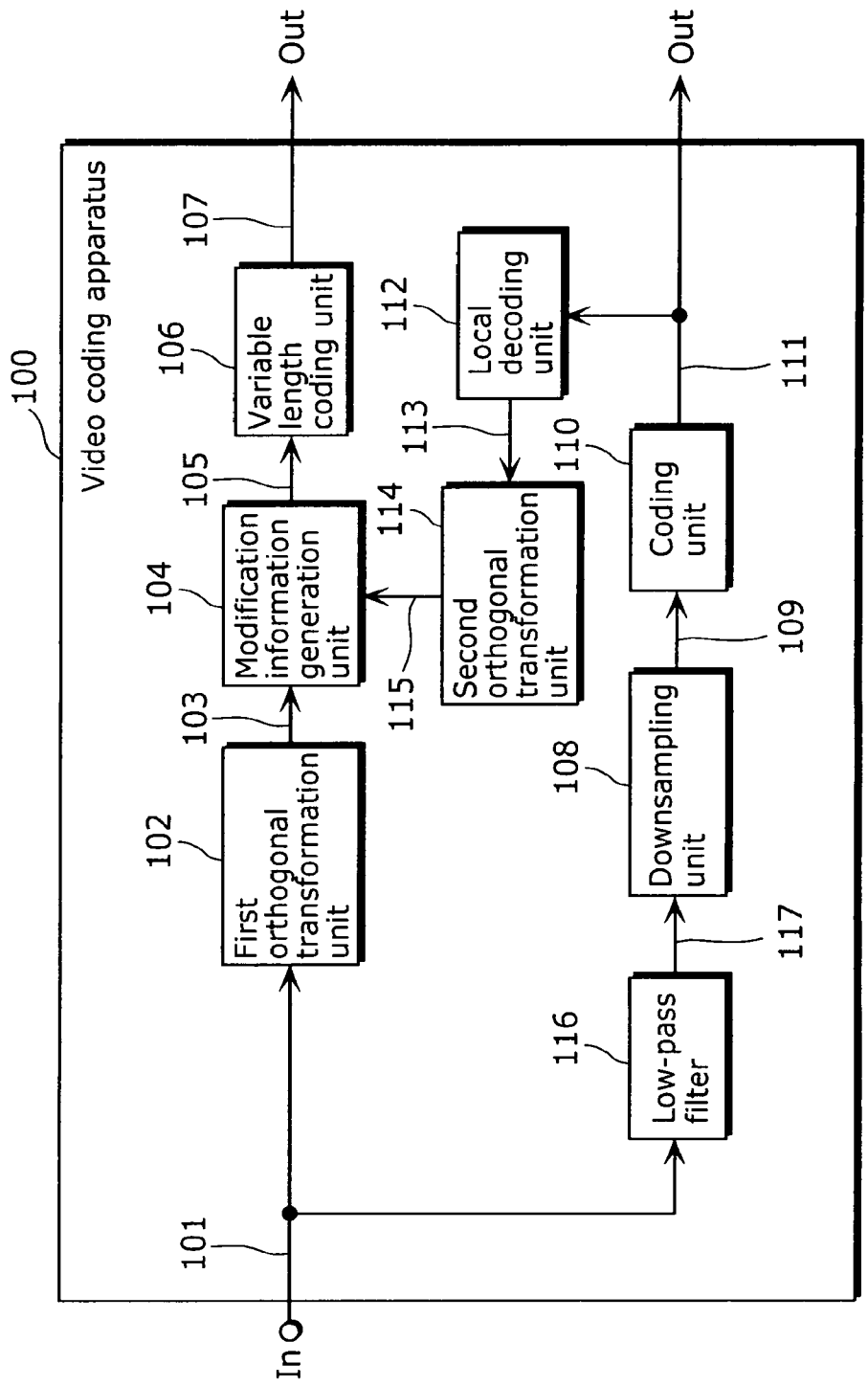
FIG. 1 is a block diagram showing a structure of a video coding apparatus according to a first embodiment of the present invention.

101 Input picture signal
102 First orthogonal transformation unit
103 Input image DCT coefficients
104 Modification information generation unit
105 Modification information
106 Variable length coding unit
107 Coded modification information bit stream
108 Downsampling unit
109 Reduced image signal
110 Coding unit
111 Coded bit stream
112 Local decoding unit
113 Decoded image signal
114 Second orthogonal transformation unit
115 Decoded image DCT coefficients
116 Low-pass filter
117 Low-frequency image signal
701 Coded modification information bit stream
702 Variable length decoding unit
703 Modification information
704 Coded bit stream
705 Decoding unit
706 Decoded image signal
707 Orthogonal transformation unit
708 Decoded image DCT coefficients
709 Coefficient modification unit
710 Modified DCT coefficients
711 Inverse orthogonal transformation unit
712 Output image signal
1003 Picture header
1004 Macroblock header
1005 Macroblock data
Cs Computer system
FD Flexible disk
FDD Flexible disk drive

BEST MODE FOR CARRYING OUT THE INVENTION

Each of the embodiments of the present invention will be described below with reference to the drawings.

First Embodiment

FIG. 1 is a block diagram showing a structure of a video coding apparatus according to a first embodiment of the present invention.

A video coding apparatus 100 is an apparatus for compressing and coding a video signal, and includes, as shown in FIG. 1, a first orthogonal transformation unit 102, a modification information generation unit 104, a variable length coding unit 106, a downsampling unit 108, a coding unit 110, a local decoding unit 112, a second orthogonal transformation unit 114, and a low-pass filter 116.

The first orthogonal transformation unit 102 performs discrete cosine transform (DCT) on an input picture signal 101 and outputs an input image DCT coefficients 103. The low-pass filter 116 performs low-pass filtering on the input picture signal 101 so as to suppress data in the high-frequency range of the picture signal, and outputs a low-frequency image signal 117. The downsampling unit 108 downsamples the resolution of the low-frequency image signal 117 to a predetermined resolution, and outputs a reduced image signal 109. The coding unit 110 compresses and codes the reduced image signal 109 by a predetermined coding method, and outputs a coded bit stream 111. The local decoding unit 112 decodes the coded bit stream 111 by a method corresponding to the coding method used in the coding unit 110, and outputs a decoded image signal 113. The second orthogonal transformation unit 114 performs discrete cosine transform on the decoded image signal 113, and outputs decoded image DCT coefficients 115. The modification information generation unit 104 generates, based on the input image DCT coefficients 103 and the decoded image DCT coefficients 115, coefficient modification information 105 for modifying the orthogonal transformation coefficients obtained through orthogonal transformation of a decoded video signal obtained from the coded bit stream. The variable length coding unit 106 performs variable length coding on the coefficient modification information 105 so as to output a coded modification information bit stream 107 as additional information of the coded bit stream 111.

Next, the operations of the video coding apparatus 100 as structured as above will be described. FIG. 2A is a diagram showing coefficient values A to P of the input image DCT coefficients, while FIG. 2B is a diagram showing coefficient values a to d of the decoded image DCT coefficients.

The input picture signal 101 is inputted to the first orthogonal transformation unit 102 and the low-pass filter 116. When receiving the input picture signal 101, the first orthogonal transformation unit 102 performs discrete cosine transform (DCT) on the input picture signal 101 and outputs the input image DCT coefficients 103. Assuming here that discrete cosine transform is performed on each block of 4×4 pixels, the first orthogonal transformation unit 102 outputs the coefficient values A to P of the input image DCT coefficients, as shown in FIG. 2A.

On the other hand, the low-pass filter 116 performs low-pass filtering on the input picture signal 101 so as to suppress data in the high-frequency range of the input picture signal 101, and outputs a low-frequency image signal 117. Next, the downsampling unit 108 downsamples the resolution of the low-frequency image signal 117 to a predetermined resolution, and outputs the reduced image signal 109. It is assumed here that the low-frequency image signal 117 is reduced to one half both vertically and horizontally. The coding unit 110 compresses and codes the reduced image signal 109 by a predetermined coding method, and outputs the coded bit stream 111. The local decoding unit 112 decodes the coded bit stream 111 by a method corresponding to the coding method used in the coding unit 110, and outputs the decoded image signal 113. The second orthogonal transformation unit 114 performs discrete cosine transform on the decoded image signal 113, and outputs the decoded image DCT coefficients 115. Since the decoded image signal 113 is an image signal obtained by reducing the low-frequency image signal 117 to one half both vertically and horizontally, if discrete cosine transform is performed on each block of 2×2 pixels, the second orthogonal transformation unit 114 outputs the coefficient values a to d of the decoded image DCT coefficients, as shown in FIG. 2B. Note that these coefficient values a to d of the decoded image DCT coefficients respectively correspond to the coefficient values A to D which are the values of the lower-frequency coefficients out of the input image DCT coefficients, and therefore their values a to d are approximately the same as the values A to D. Next, the modification information generation unit 104 generates, based on the input image DCT coefficients 103 and the decoded image DCT coefficients 115, the coefficient modification information 105 to be used when decoding a coded bit stream.

Figure 3:
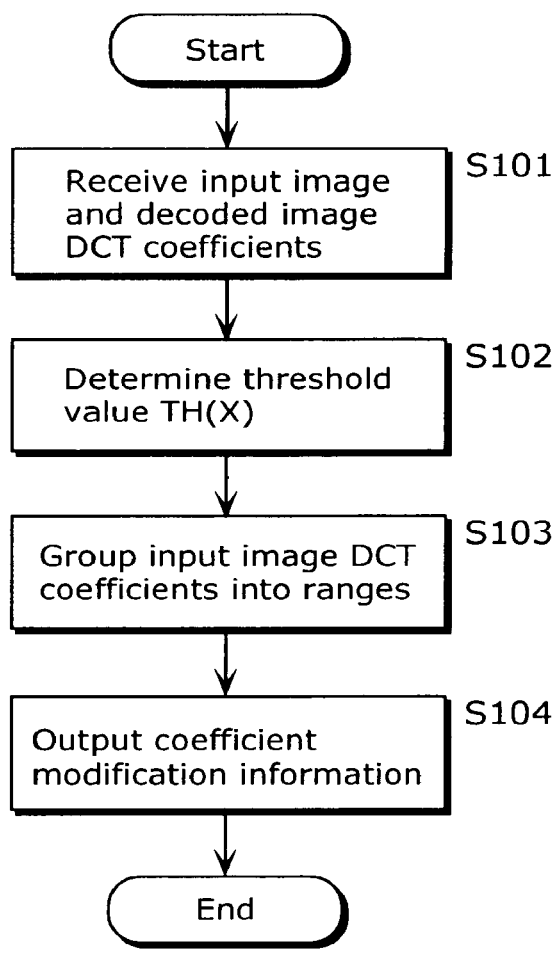
FIG. 3 is a flowchart showing a sequence of operations performed by a modification information generation unit when it generates coefficient modification information.

FIG. 3 is a flowchart showing a sequence of operations performed by the modification information generation unit 104 when it generates the modification information 105.

Figure 4A:
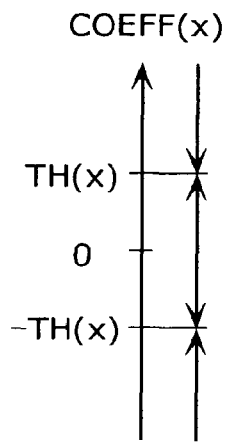
FIGS. 4A, 4B, 4C and 4D are diagrams for explaining a threshold value TH(X).

When receiving the input image DCT coefficients 103 and the decoded image DCT coefficients 115 (Step S101), the modification information generation unit 104 determines, based on the decoded image DCT coefficients 115, a threshold value TH(X) used for grouping the coefficient values into a predetermined number of ranges of values the input image DCT coefficients 103 can have, on a block-by-block basis, for example, as shown in FIG. 4A (Step S102). In the example shown in FIG. 4A, one threshold value TH(X) is determined to group the coefficient values into three ranges ($\alpha$), ($\beta$) and ($\gamma$). Here, COEFF(X) denotes a DCT coefficient of a location (frequency band) X, and TH(X) denotes a predetermined threshold value corresponding to the location X.

Figure 4B:
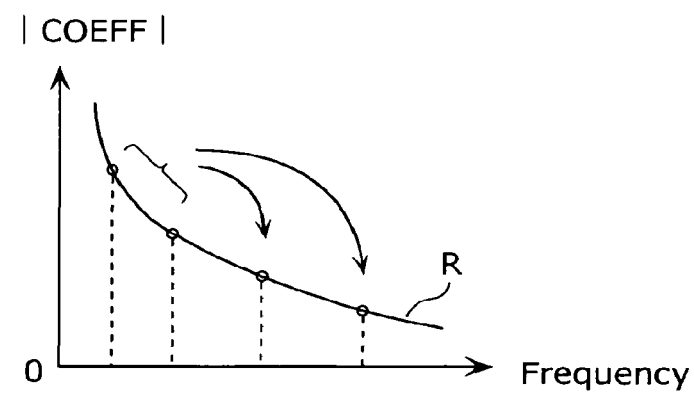
Figure 4C:
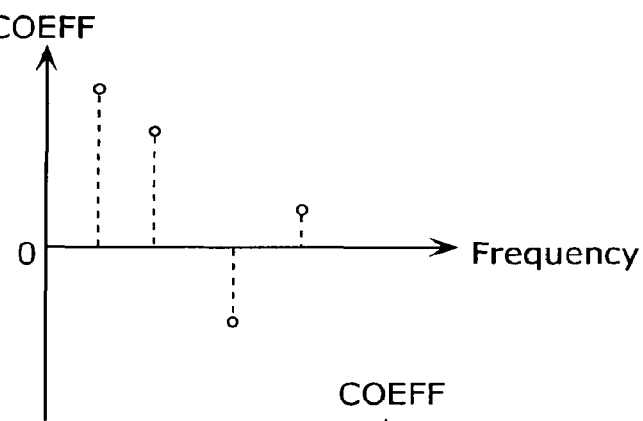
Figure 4D:
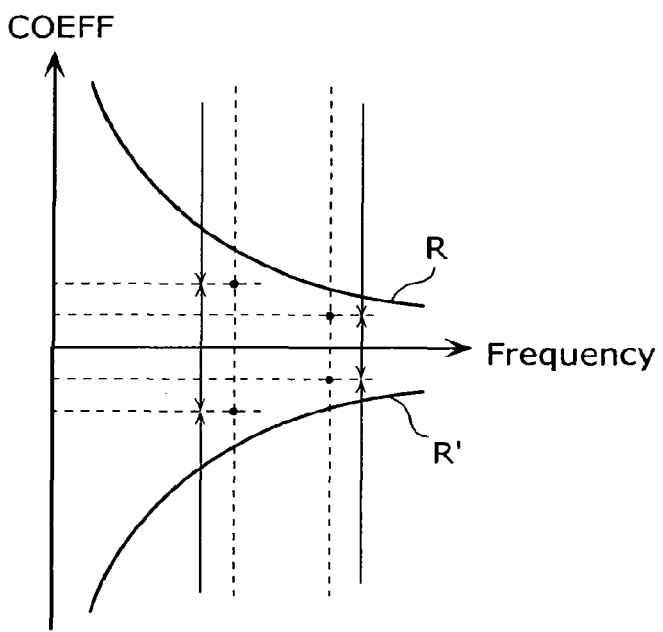

Generally, the absolute values of DCT coefficients (COEFF) attenuate as the frequency increases, as shown in a curve R of FIG. 4B. Therefore, the curve R can be predicted using the decoded image DCT coefficients 115. Since DCT coefficients (COEFF) actually have discrete values as shown in FIG. 4C, the threshold value TH(X) is determined for each frequency band of DCT coefficients by predicting the curve R and the curve R' as shown in FIG. 4D.

Next, the modification information generation unit 104 groups the input image DCT coefficients 103 into three ranges ($\alpha$), ($\beta$) and ($\gamma$) using the determined threshold value TH(X) by the following Equation 1 (Step S103). Note that the coefficient values A to D, which are the values of the lower-frequency coefficients out of the input image DCT coefficients, are not grouped.

$$|COEFF(X)| < TH(X) \quad \text{(Equation 1)}$$

where COEFF(X) denotes a DCT coefficient of a location X, and TH(X) denotes a predetermined threshold value corresponding to the location X, and the symbol | | denotes an absolute value.

FIG. 2C is a diagram showing an example of input image DCT coefficients grouped into three ranges to which respective coefficients belong, using a threshold value TH(X). For example, in FIG. 2C, the input image DCT coefficients are grouped into the following ranges of values: a range ($\gamma$) of the coefficient values (G, I and O) which satisfy the above Equation 1; a range ($\alpha$), indicated by rising diagonal strokes from bottom left to top right, of the coefficient values (F, J and L) which do not satisfy the above Equation 1 and are positive COEFF(X) values; and a range ($\beta$), indicated by falling diagonal stroked from top left to bottom right, of the coefficient values (E, H, K, M, N and P) which do not satisfy the above Equation 1 and are negative COEFF(X) values.

Next, the modification information generation unit 104 outputs, as coefficient modification information 105, information indicating the determined grouping of each input image DCT coefficient, i.e., to which range it belongs, the range ($\alpha$), the range ($\beta$) or the range ($\gamma$) (Step S104).

Then, the variable length coding unit 106 performs variable length coding on the coefficient modification information 105 so as to output a coded modification information bit stream 107.

As described above, the video coding apparatus 100 outputs, as a coding result, the coded modification information bit stream 107 as well as the coded bit stream 111 which is a compressed and coded reduced image signal 109 obtained by downsampling, thereby allowing suppression of data amount required for increasing the resolution. In addition, since a threshold value TH(X) suitable for a block image can be determined because it is determined on a block-by-block basis, thereby allowing an increase in decoded image quality.

In this case, at the decoder side, to be described later, it is possible to reconstruct input image DCT coefficients by predicting the curve R and the curve R' from decoded image DCT coefficients which can be obtained from the coded bit stream 111 and identifying the high-frequency coefficient values E to P out of the input image DCT coefficients based on the grouping information obtained from the coded modification information bit stream 107. Therefore, the quality of the decoded image can be enhanced.

Note that in the present embodiment, the modification information generation unit 104 determines a threshold value TH(X) corresponding to a location X on the basis of a block to be DCT-processed, but the present invention is not limited to this determination. For example, the modification information generation unit 104 can determine the threshold value TH(X) for every four blocks or picture, thereby reducing an amount of processing.

Furthermore, in the present embodiment, the modification information generation unit 104 determines the threshold value TH(X) based on the curve R predicted using the decoded image DCT coefficients, but the present invention is not limited to this determination. For example, the threshold value TH(X) may be previously set. In this case, since there is no need to use the decoded image DCT coefficients, it is possible to structure the video coding apparatus 100 without the local decoding unit 112 and the second orthogonal transformation unit 114. The information of the threshold value TH(X) may be outputted as coefficient modification information. By doing so, the quality of the decoded image can be enhanced.

The present embodiment shows an example in which input image DCT coefficients are grouped into three ranges, but the present invention is not limited to this grouping into three ranges. For example, if plural threshold values TH(X) are used, the number of ranges increases, and thus the quality of the decoded image can be enhanced.

Note that in the present embodiment, the coefficient values A to D, which are the values of the lower-frequency coefficients out of the input image DCT coefficients, are not grouped, but they may be grouped so that their grouping is included in the grouping information. By doing so, it is possible to further reduce the number of bits of DCT coefficients.

Grouping information can be prepared in advance at the decoder side. In this case, by outputting the coefficient modification information only when the grouping information is different from the grouping information prepared at the decoder side, the data amount of the coefficient modification information 105 can be reduced.

At the decoder side, plural pieces of grouping information can be prepared. In this case, by outputting the information identifying the grouping information prepared at the decoder side as well as the coefficient modification information to be used when the outputted grouping information is different from the identified grouping information, the data amount of the coefficient modification information 105 can be reduced.

In the present embodiment, Discrete Cosine Transform (DCT) is used as orthogonal transform, but the present invention is not limited to this transform. For example, Discrete Wavelet Transform (DWT) or Haramard Transform (HT) may be used.

The present embodiment describes assuming that, as DCT coefficients, input image DCT coefficients are 16 coefficients A to P while decoded image DCT coefficients are 4 coefficients a to d, but the respective numbers of transform coefficients are not limited to these numbers.

In the present embodiment, the downsampling unit 108 reduces the resolution to a predetermined one, but it may reduce the resolution to a resolution other than such a predetermined one. In this case, the coefficient modification information including how to reduce the resolution can be outputted. By doing so, an image can be displayed at the resolution determined according to the content of the image.

(Modification 1)

In the above first embodiment, the case is described where the above grouping information is outputted as the coefficient modification information 105. In the present modification, however, the case is described where not the grouping information itself but information for identifying the grouping information is outputted as the coefficient modification information 105. Note that the structure of the video coding apparatus 100 is the same as that of the above first embodiment except the structure and the operation of the modification information generation unit 104.

For example, the modification information generation unit 104 has: a first grouping table in which possible grouping combinations of input image DCT coefficients are associated with corresponding combination numbers (i1, i2, . . . ), as shown in FIG. 5A; and a second grouping table in which possible grouping combinations of decoded image DCT coefficients are associated with corresponding combination numbers (d1, d2, . . . ), as shown in FIG. 5B. The modification information generation unit 104 also has a code table, as shown in FIG. 5C, for determining a specific code based on a combination number for the input image DCT coefficients and a combination number for the decoded image DCT coefficients. Note that the cube of 16 of combinations are possible in total for grouped input image DCT coefficients, while the cube of 4 of combinations are possible in total for grouped decoded image DCT coefficients, but these two tables need not have all these possible combinations. For example, they may have similar combinations as one combination. In the code table, the codes can be previously assigned based on the correlation indicating how much the combinations of the grouped decoded image DCT coefficients are likely to occur for respective combinations of the grouped input image DCT coefficients.

Figure 6:
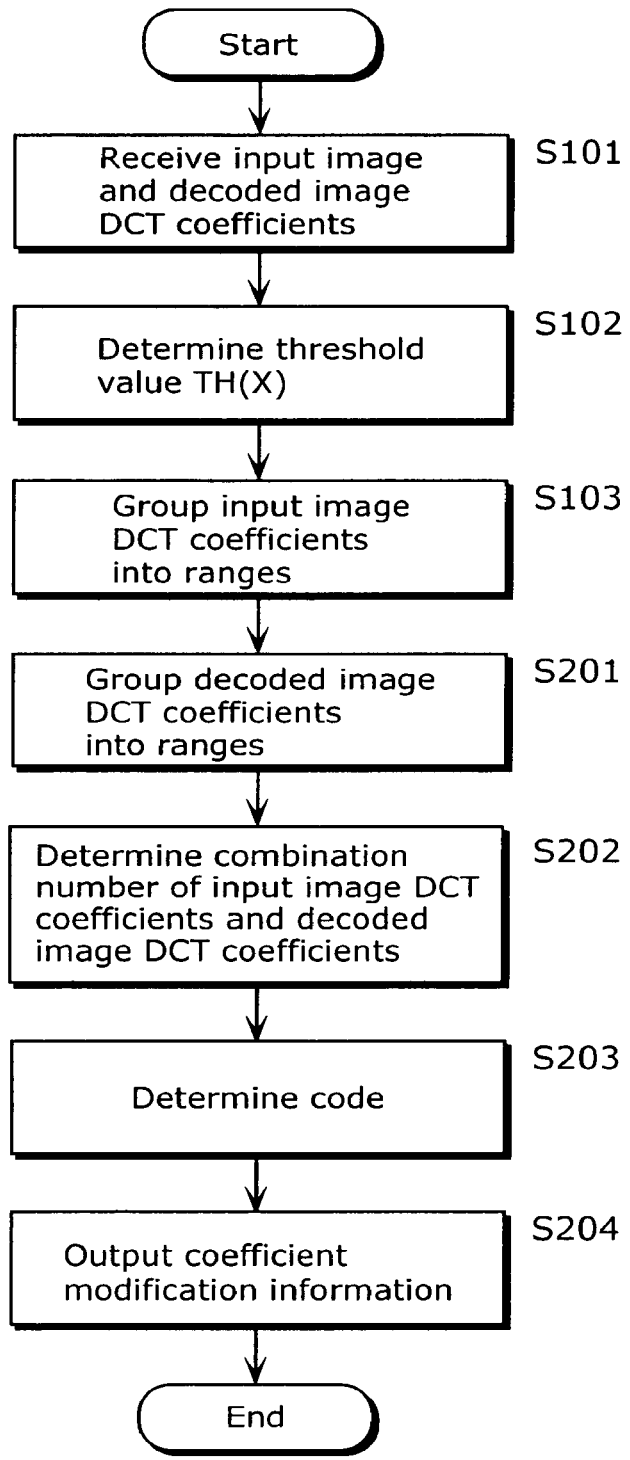
FIG. 6 is a flowchart showing a sequence of operations performed by the modification information generation unit when it generates coefficient modification information in a modification 1.

FIG. 6 is a flowchart showing a sequence of operations performed by the modification information generation unit 104 when it generates the modification information 105. Note that as for the same process as that of the first embodiment, the description is omitted.

The process from reception of the input image DCT coefficients 103 and the decoded image DCT coefficients 115 (Step S101) to grouping of the input image DCT coefficients 103 into three ranges (α), (β) and (γ) (Step S103) is the same as that of the above first embodiment. Next, as is the case with the input image DCT coefficients 103, the modification information generation unit 104 groups the decoded image DCT coefficients 103 into three ranges (α), (β) and (γ) using the determined threshold value TH(X) by the following Equation 1 (Step S201).

FIG. 2D is a diagram showing an example of decoded image DCT coefficients grouped into three ranges to which respective coefficients belong, using a threshold value TH(X). For example, in FIG. 2D, the decoded image DCT coefficients are grouped into the following ranges of values: a range (γ) of the coefficient value (a) which satisfies the above Equation 1; a range (α), indicated by rising diagonal strokes from bottom left to top right, of the coefficient values (b and c) which do not satisfy the above Equation 1 and are positive COEFF(X) values; and a range (β), indicated by falling diagonal stroked from top left to bottom right, of the coefficient value (d) which does not satisfy the above Equation 1 and is negative COEFF(X) value.

Next, the modification information generation unit 104 determines the combination number for the input image DCT coefficients by referring to the grouping result of the input image DCT coefficients 103 in the first table. The modification information generation unit 104 also determines the combination number for the decoded image DCT coefficients by referring to the grouping result of the decoded image DCT coefficients 115 in the second table (Step S202). Next, the modification information generation unit 104 determines a specific code by referring to the combination number for the input image DCT coefficients and the combination number for the decoded image DCT coefficients in the table (Step S203). For example, in the case where the combination number for the decoded image DCT coefficients is (d2) and the combination number for the input image DCT coefficients is (i1), the modification information generation unit 104 determines the code to be (0) by referring to the code table as shown in FIG. 5C. Then, the modification information generation unit 104 outputs the determined code as coefficient modification information (Step S204).

As described above, since the code for identifying grouping information indicating a combination of the grouped input image DCT coefficients is outputted as coefficient modification information, the data amount of the coefficient modification information can be reduced. In this case, it is possible, at the decoder side, to obtain the combination of the grouped input image DCT coefficients using the combination number for the decoded image DCT coefficients which can be obtained at the decoder side as well as the code obtained as the coefficient modification information.

Note that the present modification describes the case where only one code table is included, as shown in FIG. 5C, but the present invention is not limited to this case. For example, a plurality of code tables may be included, as shown in FIG. 5D. In this case, the code table can be switched, for example, depending on the coefficient value a of a decoded image DCT coefficient. By doing so, the data amount of the coefficient modification information 105 can be further reduced.

A combination of grouped coefficients which is common to the decoder side and the encoder side can be previously held. In this case, the difference from the combination common to both sides can be transmitted as coefficient modification information. By doing so, the data amount of the coefficient modification information 105 can be reduced.

(Modification 2)

In the above first embodiment, the case is described where the above grouping information is outputted as the coefficient modification information 105. In the present modification, however, the case is described where not the grouping information itself but linear prediction coefficients are outputted as the coefficient modification information 105. Note that the structure of the video coding apparatus 100 is the same as that of the above first embodiment except the structure and the operation of the modification information generation unit 104.

FIG. 7A is a schematic diagram showing that input image DCT coefficients are calculated by performing linear prediction operation using decoded image DCT coefficients. FIG. 7A shows the case where the decoded image DCT coefficients have the values a to d while the input image DCT coefficients have the values A to P.

Based on the input image DCT coefficients 103 and the decoded image DCT coefficients 115, the modification information generation unit 104 calculates linear prediction coefficients which are used for obtaining input image DCT coefficients by performing linear prediction operation using decoded image DCT coefficients, as shown in FIG. 7A.

FIG. 7B is a flowchart showing a sequence of operations performed by the modification information generation unit 104 when it generates the modification information 105.

When receiving the input image DCT coefficients 103 and the decoded image DCT coefficients 115 (Step S301), the modification information generation unit 104 calculates, using the following Equation 2, linear prediction coefficients which are used for obtaining input image DCT coefficients by performing linear prediction operation using decoded image DCT coefficients, as shown in FIG. 7A, (Step S302).

$$A = X1(A) \times a + X2(A) \times b + X3(A) \times c + X4(A) \times d \quad \text{(Equation 2)}$$
$$B = X1(B) \times a + X2(B) \times b + X3(B) \times c + X4(B) \times d$$
$$\ldots$$
$$P = X1(P) \times a + X2(P) \times b + X3(P) \times c + X4(P) \times d$$

where $X1(X)$ to $X4(X)$ denote linear prediction coefficients at a location X.

Next, the modification information generation unit 104 outputs the calculated linear prediction coefficients as coefficient modification information 105 (Step S303).

As described above, the video coding apparatus 100 outputs, as a coding result, the coded modification information bit stream 107 as well as the coded bit stream 111 which is a compressed and coded reduced image signal 109 obtained through downsampling, thereby allowing suppression of data amount required for increasing the resolution.

In this case, it is possible, at the decoder side, to reconstruct input image DCT coefficients using the linear prediction coefficients, from the decoded image DCT coefficients which can be obtained from the coded bit stream 111. Therefore, the quality of the decoded image can be enhanced.

Note that in the present modification, the linear prediction coefficients are outputted as coefficient modification information for all the locations A to P of the input image DCT coefficients. However, they need not always be outputted as coefficient modification information for all the locations of the input image DCT coefficients. For example, since the coefficients at the locations A to D can be derived from the decoded image DCT coefficients, the coefficient modification information 105 does not include these input image DCT coefficients, and thus the data amount thereof can be reduced. Unless the linear prediction coefficients of the input image DCT coefficients having small absolute values are not outputted, the data amount of the coefficient modification information 105 can be reduced.

In the present modification, linear prediction coefficients are calculated on a block-by-block basis and outputted as coefficient modification information, but the present invention is not limited to this case. For example, a set of blocks having similar linear prediction coefficients as well as information of such similar blocks may be outputted as coefficient modification information. FIG. 7C is a flowchart showing a sequence of operations performed by the modification information generation unit 104 in such a case when it generates the modification information 105.

When receiving the input image DCT coefficients 103 and the decoded image DCT coefficients 115 (Step S301), the modification information generation unit 104 calculates linear prediction coefficients in the same manner as mentioned above (Step S302). Next, the modification information generation unit 104 judges the similarity of linear prediction coefficients calculated on a block-by-block basis and integrates the coefficients (Step S401). This judgment of similarity is made using, as a criterion, the Euclidean distance between the linear prediction coefficients or the like, so as to integrate the coefficients having a short distance from each other. As a method of integration, the average value of the coefficients having Euclidean distance values equal to or smaller than a predetermined value is used. The modification information generation unit 104 outputs, as the coefficient modification information 105, the integrated linear prediction coefficients and integration information of the blocks (Step S303). By doing so, the data amount of the coefficient modification information 105 can be reduced.

For example, a set of blocks having similar decoded image DCT coefficients as well as information of such similar blocks may be outputted as coefficient modification information. FIG. 7D is a flowchart showing a sequence of operations performed by the modification information generation unit 104 in such a case when it generates the coefficient modification information 105.

When receiving the input image DCT coefficients 103 and the decoded image DCT coefficients 115 (Step S301), the modification information generation unit 104 judges the similarity of decoded image DCT coefficients for each block and groups them into groups (Step S501). This judgment of similarity is made using, as a criterion, the Euclidean distance between coefficients or the like, so as to group them into groups. Next, the modification information generation unit 104 calculates linear prediction coefficients for each of these groups (Step S502). Then, the modification information generation unit 104 outputs, as the coefficient modification information 105, these linear prediction coefficients and integration information of the blocks (Step S503). By doing so, the data amount of the coefficient modification information 105 can be reduced.

When the method described in FIG. 7D is used, by grouping the decoded image DCT coefficients into groups in the same manner at both the decoder side and the encoder side, there is no need to output integration information as coefficient modification information. In this case, the data amount of the coefficient modification information 105 can be further reduced.

In the present modification, the common linear prediction coefficients may be previously held in both the decoder side and the encoder side so that the differences between the calculated linear prediction coefficients and the common linear prediction coefficients are transmitted as coefficient modification information. By doing so, the data amount of the coefficient modification information 105 can be reduced.

(Modification 3)

In the above first embodiment, the case is described where the above grouping information is outputted as the coefficient modification information 105. In the present modification, however, the case is described where not the grouping information itself but modification levels are outputted as the coefficient modification information 105. Note that the structure of the video coding apparatus 100 is the same as that of the above first embodiment except the structure and the operation of the modification information generation unit 104.

The modification information generation unit 104 divides the input image DCT coefficients 103 and the decoded image DCT coefficients 115 of plural blocks included in a predetermined image area respectively into sets of coefficients of respective frequency bands, calculates the respective correlation levels, and determines the modification levels depending on the calculated correlation levels.

Figure 10:
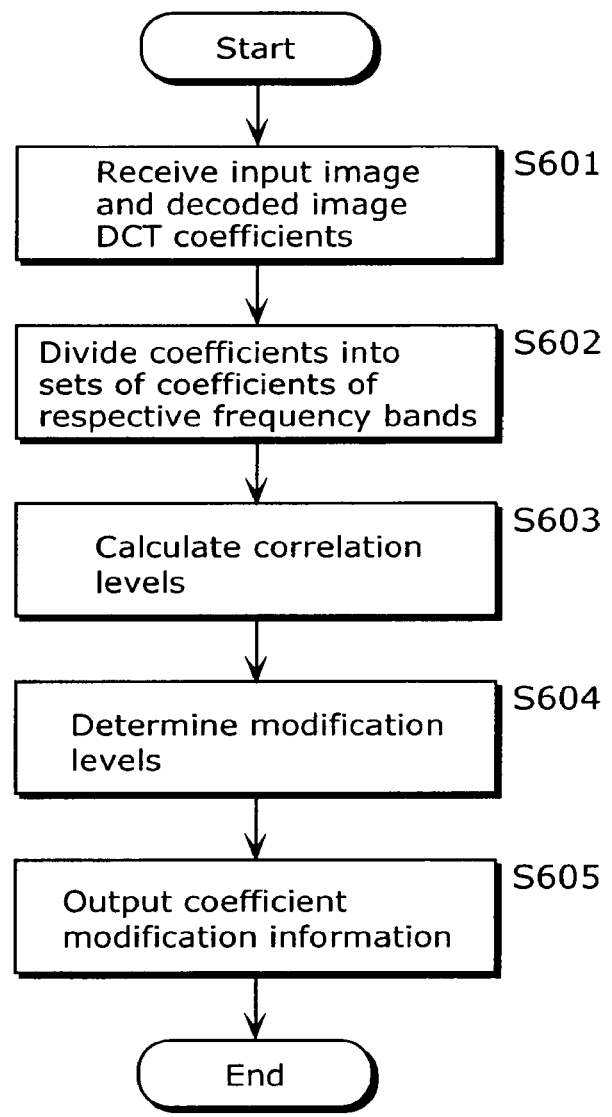
FIG. 10 is a flowchart showing a sequence of operations performed by the modification information generation unit when it generates coefficient modification information in a modification 3.

FIG. 10 is a flowchart showing a sequence of operations performed by the modification information generation unit 104 when it generates the coefficient modification information 105 in the modification 3. FIG. 8A shows blocks within a predetermined image area of an input picture, FIG. 8B shows coefficient values A to P of the input image DCT coefficients of a block, and FIG. 8C shows sets of coefficients of each predetermined image area. FIG. 9A shows blocks within a predetermined image area of a decoded image, FIG. 9B shows coefficient values a to d of the decoded image DCT coefficients of a block, and FIG. 9C shows sets of coefficients of each predetermined image area.

When receiving the input image DCT coefficients 103 and the decoded image DCT coefficients 115 of plural blocks (9 blocks in this example) included in a predetermined area as shown in FIG. 8A and FIG. 9A (Step S601), the modification information generation unit 104 divides each block into a set of coefficients in respective frequency bands, as shown in FIG. 8C and FIG. 9C (Step S602). Next, the modification information generation unit 104 calculates the correlation levels indicating the similarity between the sets of coefficients at the input image side and the sets of coefficients at the decoded image side (Step S603). For example, the correlation levels between the set of coefficients A1 to A9 and the respective sets of coefficients a1 to a9, b1 to b9, c1 to c9, and d1 to d9 are calculated. The correlation levels between the sets of coefficients B1 to B9 and P1 to P9 and the above respective sets of coefficients are also calculated. Next, the modification information generation unit 104 determines the location of the set of coefficients of the decoded image having the highest correlation with the respective sets of coefficients of the input image, and determines the modification level depending on their correlation level (Step S604). For example, this modification level is close to 0 when the correlation level is low, while it is close to 1 when the correlation level is high. Then, the modification information generation unit 104 outputs, as coefficient modification information 105, information indicating the locations of the determined sets of coefficients as well as their modification levels (Step S605).

As described above, the video coding apparatus 100 outputs, as a coding result, the coded modification information bit stream 107 as well as the coded bit stream 111 which is a compressed and coded reduced image signal 109 obtained through downsampling, thereby allowing suppression of data amount required for increasing the resolution.

In this case, it is possible, at the decoder side, to reconstruct input image DCT coefficients using the information indicating the locations of the sets and the modification levels, from the decoded image DCT coefficients which can be obtained from the coded bit stream 111. Therefore, the quality of the decoded image can be enhanced.

Note that in the present modification, the size of a predetermined area need not always be determined. When it is not predetermined, how to determine the size of a predetermined area is outputted as coefficient modification information. By doing so, the coefficient modification information can be generated depending on the images, and thus the quality of the decoded image can be enhanced.

In the present modification, the common modification levels may be previously held in both the decoder side and the encoder side so that the differences between the calculated modification levels and the common modification levels are transmitted as coefficient modification information. By doing so, the data amount of the coefficient modification information 105 can be reduced.

(Modification 4)

Figure 11:
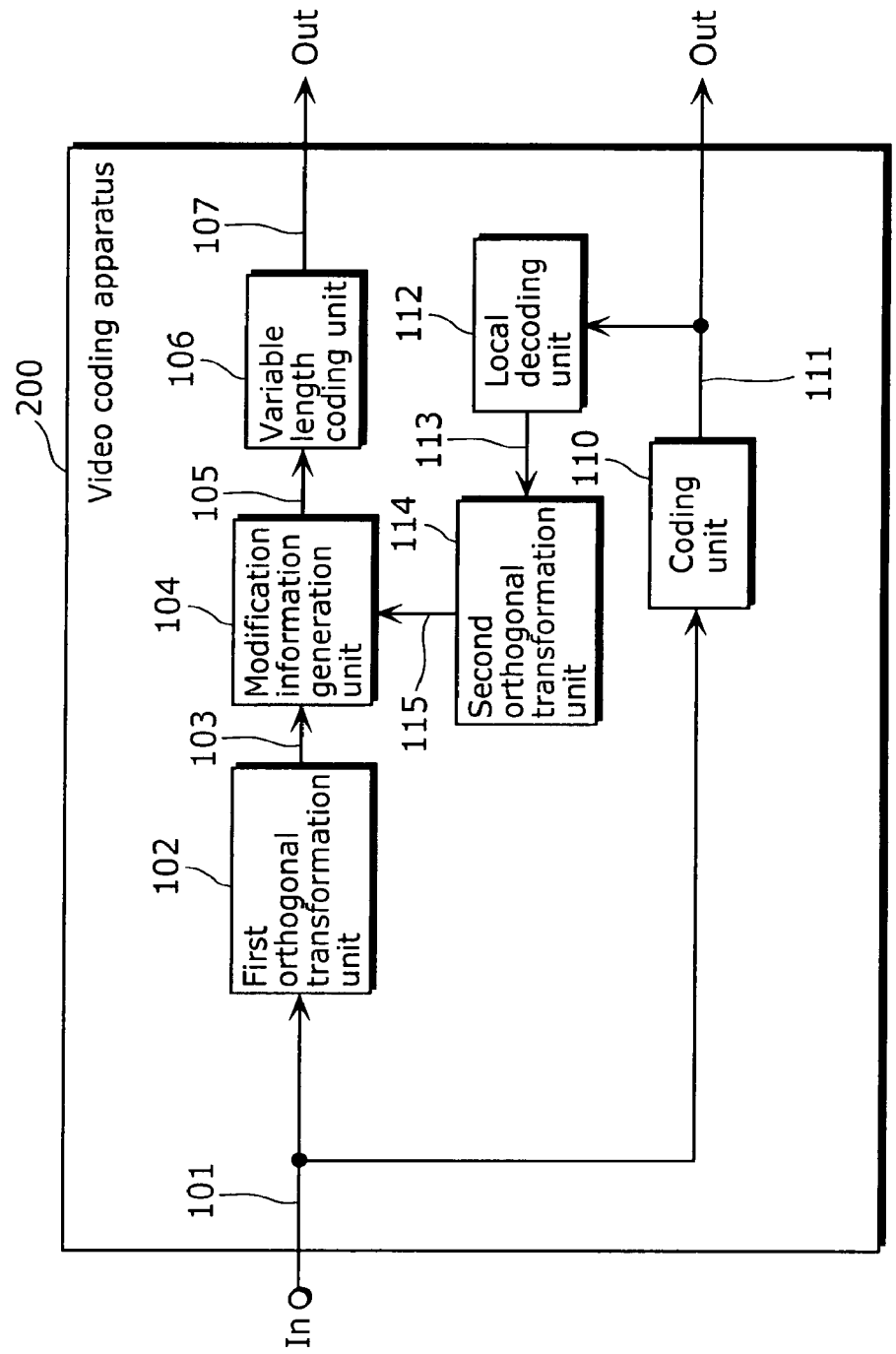
FIG. 11 is a block diagram showing a structure of a video coding apparatus according to a modification 4 of the first embodiment of the present invention.

FIG. 11 is a block diagram showing a structure of a video coding apparatus according to a modification 4 of the first embodiment of the present invention. Note that as for the same operations as those of the first embodiment, the description is omitted.

Unlike the video coding apparatus 100, a video coding apparatus 200 does not include the low-pass filter 116 and the downsampling unit 108. The video coding apparatus 200 has the same structure as the video coding apparatus 200 except the above two elements. Therefore, the coding unit 110 compresses and codes the input picture signal 101 by a predetermined coding method and outputs the coded bit stream 111.

As described above, since low-pass filtering and resolution conversion are not used, the processing circuit can be simplified. In addition, since coefficient modification information is used, the quality of a decoded image can be increased compared with the image quality obtained by the conventional coding method.

Note that the apparatus of the modification 4 does not include the low-pass filter 116 and the downsampling unit 108, but the present invention is not limited to this structure. For example, the apparatus of the modification 4 may have a structure without one of the low-pass filter 116 and the downsampling unit 108.

Next, how to transmit coefficient modification information will be explained. FIGS. 12A to 12C are diagrams for explaining how to transmit coefficient modification information. More specifically, FIG. 12A is a diagram showing an example where a coded bit stream of additional information is transmitted separately from a coded bit stream of picture data; FIG. 12B is a diagram showing an example where additional information is inserted into the picture header of a coded bit stream; and FIG. 12C is a diagram showing an example where additional information is inserted into the macroblock header of a coded bit stream.

In the first embodiment including the above modifications 1 to 4, the coefficient modification information 105 is variable-length coded by the variable length coding unit 106, and then transmitted, as a coded modification information bit stream 107, separately from the coded bit stream 111, as shown in FIG. 12A. In this case, since the coded bit stream 111 is transmitted completely independent of the coded modification information bit stream 107 which is additional information, a proper decoded image can be generated at the decoder side even if the decoder side does not support the coded modification information bit stream 107. If a video decoding method which supports the coded modification information bit stream 107 is used, high-frequency information can be reconstructed, and thus the quality of a decoded image can be enhanced. Furthermore, since the coded modification information bit stream 107 is transmitted as separate information from the coded bit stream 111, a transmission apparatus can stop the transmission itself of the coded modification information bit stream 107. Therefore, it is possible not to transmit the coded modification information bit stream 107 in narrow band communication, if it is not necessary.

Note that the coefficient modification information may be transmitted not only as a coded modification information bit stream 107 separately from the coded bit stream 111 as in the above manner, but also as data included in the coded bit stream 111.

For example, the coefficient modification information 105 may be inserted into an area, where data can be inserted freely, of a picture header 1003 in the coded bit stream 111. Here, an area where data can be inserted freely means an area where the standard defines that specific processing should or should not be performed on information inserted therein. For example, this is an area called user data in the MPEG standards. A picture header is an information area which is added to each picture and in which information common throughout the image of the picture is to be inserted.

In this case, a proper decoded image can be generated at the decoder side even if the decoder side does not support the coefficient modification information 105. Furthermore, if a video decoding method which supports the coefficient modification information 105 is used, high-frequency information can be reconstructed, and thus the quality of a decoded image can be enhanced.

Note that FIG. 12B shows the case where the information is inserted into a picture header, but the present invention is not limited to the picture header. It may be another area in which data can be inserted freely, such as a sequence header which is an information area located at the beginning of a video sequence, a GOP header which is an information area for a specified section of a video sequence, or the like.

Alternatively, the coefficient modification information 105 may be inserted into the macroblock header 1004 in the coded bit stream 111, as shown in FIG. 12C, for example. Here, a macroblock header is an information area which is added to each specified area obtained by dividing the image of one picture into areas. A specified area is, for example, a block of 16 pixels by 16 pixels in size. This data of each area is stored in the macroblock data 1005. Since the coefficient modification information 105 is not always contained in all the areas, it is inserted only into the necessary areas.

In this case, since the coefficient modification information 105 can be inserted only into the necessary areas, an amount of information to be transmitted can be reduced.

It is possible to further reduce an amount of information to be transmitted by using the above-mentioned transmission method of coefficient modification information. Or, it is possible to transmit the information even if, for example, the decoder side does not support the information, which is advantageous in a practical aspect.

Note that the first embodiment including the above modifications 1 to 4 describes that the coefficient modification information 105 is variable-length coded and then transmitted as the coded modification information bit stream 107, but the coded modification information bit stream 107 need not always be transmitted. For example, the coefficient modification information 105 can be transmitted only when the decoder side judges that modification is necessary. In order to transmit the coefficient modification information 105, information indicating that the insertion of the coefficient modification information 105 is added to the coded bit stream 111. The information is added in the same manner as the transmission method shown in FIGS. 12A to 12C. By doing so, it is easily judged that the coefficient modification information is added to a specified area when the coded bit stream 111 is decoded. Therefore, not only the circuit size can be reduced but also the image quality can be enhanced.

The first embodiment including the above modifications 1 to 4 describes plural methods for adding the coefficient modification information 105 one by one, but two or more of these methods may be used. For example, if information indicating the type of the coefficient modification information is added to the coded modification information bit stream 107, the decoder side can easily judge how it can use the coefficient modification information. Since information indicating the type of coefficient modification information which varies from block to block can be inserted into the coded modification information bit stream 107, the image quality can be improved. It is described here that the information indicating the type of coefficient modification information is added to the coded modification information bit stream 107, but the present invention is not limited to this information. For example, the coded bit stream 111 may indicate the type of coefficient modification information. In this case, the type of coefficient modification information can be judged at the time of decoding. Note that information indicating the location where the coefficient modification information is recorded may be inserted into the coded bit stream 111. In this case, information can be communicated easily even if a coded bit stream and coefficient modification information are managed separately.

The first embodiment including the above modifications 1 to 4 also describes the case where resolution conversion is not performed, but for example, information indicating whether or not to perform resolution conversion or information indicating to which size the conversion is performed may be recorded in the coded modification information bit stream 107. In this case, since the resolution can be changed for each image type, improvement of image quality can be achieved according to the image properties. Note that the information regarding resolution conversion need not always be recorded in the coded modification information bit stream 107, and it may be inserted into the coded bit stream 111. Note that a processing method of an output image may be changed using the information indicating whether or not to perform resolution conversion. For example, when resolution conversion is performed, a higher quality of an output image can be obtained by applying a noise reduction filter to each unit of resolution conversion.

Second Embodiment

Figure 13:
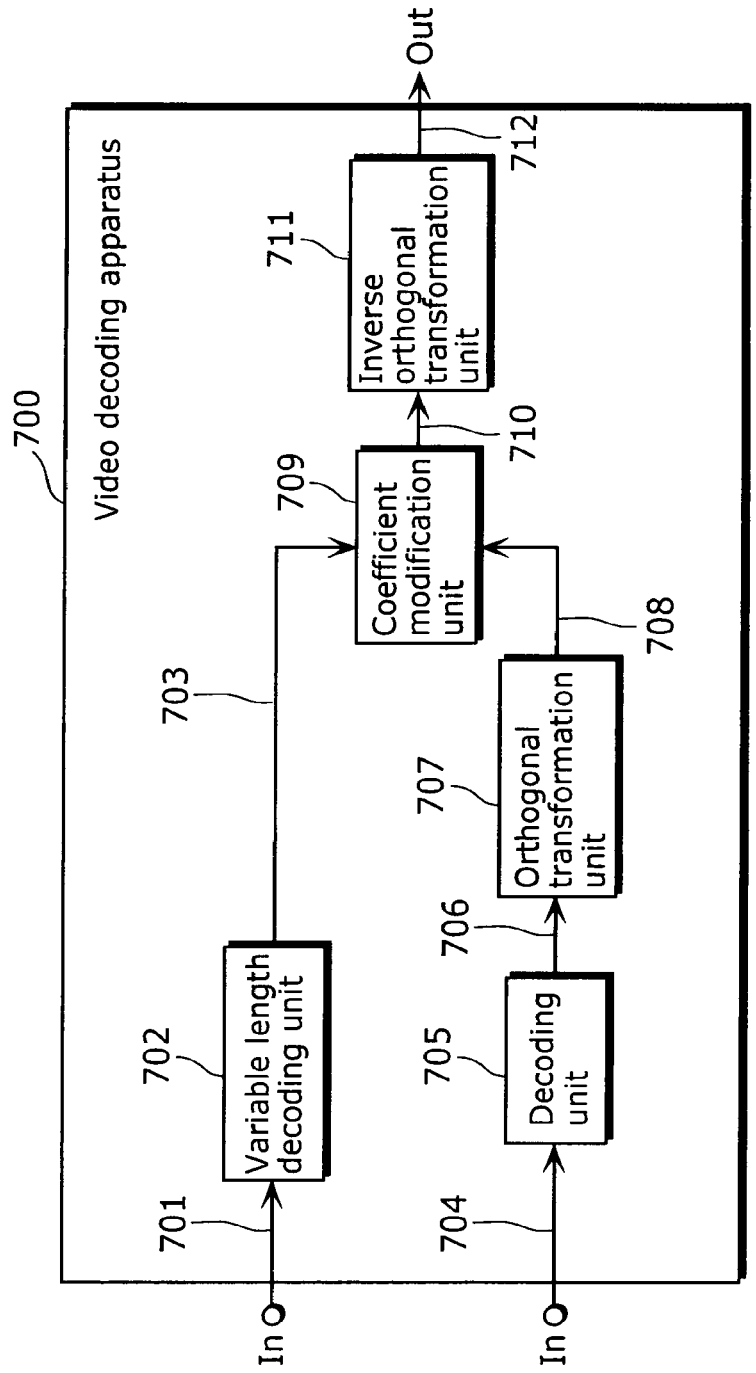
FIG. 13 is a block diagram showing a structure of a video decoding apparatus according to a second embodiment of the present invention.

FIG. 13 is a block diagram showing a structure of a video coding apparatus according to a second embodiment of the present invention.

A video decoding apparatus 700 is an apparatus for decoding a coded bit stream of a compressed and coded video signal. It includes a variable length decoding unit 702, a decoding unit 705, an orthogonal transformation unit 707, a coefficient modification unit 709 and an inverse orthogonal transformation unit 711.

The variable length decoding unit 702 performs variable length decoding on a coded modification information bit stream 701 so as to output coefficient modification information 703. The decoding unit 705 performs video decoding on the coded bit stream 704 by a predetermined method so as to output a decoded image signal 706. The orthogonal transformation unit 707 performs discrete cosine transform on the decoded image signal 706 so as to output decoded image DCT coefficients 708. The coefficient modification unit 709 outputs modified DCT coefficients 710 based on the coefficient modification information 703 and the decoded image DCT coefficients 708. The inverse orthogonal transformation unit 711 outputs an output image 712 by performing inverse discrete cosine transform on the modified DCT coefficients 710.

Next, the operations of the video decoding apparatus 700 as structured as above will be described.

The coded modification information bit stream 701 and the coded bit stream 704 are inputted to the variable length decoding unit 702 and the decoding unit 705 respectively. The variable length decoding unit 702 performs variable length decoding on the coded modification information bit stream 701 so as to output coefficient modification information 703. On the other hand, the decoding unit 705 decodes the coded bit stream 704 by a predetermined method so as to output the decoded image signal 706. The orthogonal transformation unit 707 performs discrete cosine transform on the decoded image signal 706 so as to output decoded image DCT coefficients 708. Next, the coefficient modification unit 709 outputs the modified DCT coefficients 710 based on the coefficient modification information 703 and the decoded image DCT coefficients 708.

Figure 14B:
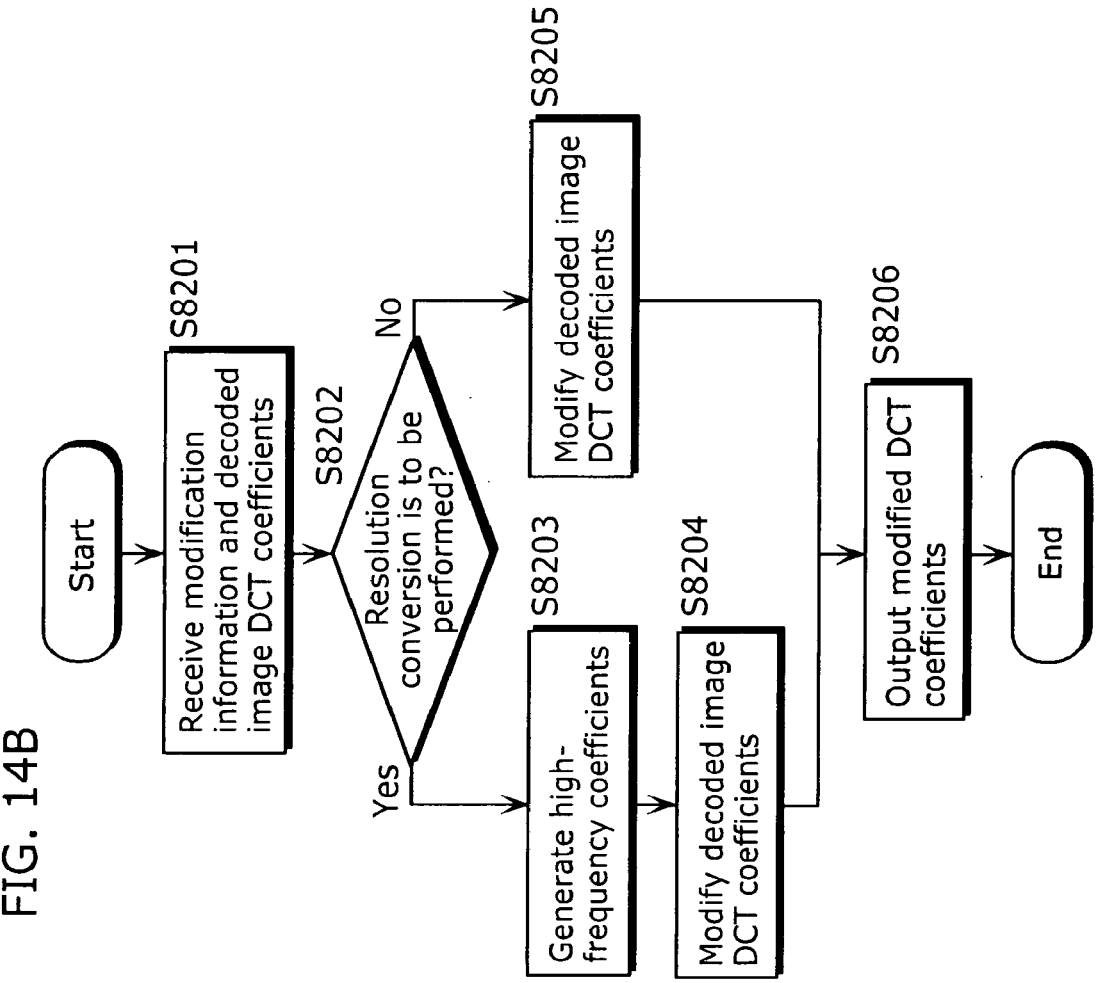
FIG. 14B is a flowchart showing a sequence of basic operations, including a judgment about resolution conversion, performed by the coefficient modification unit when it modifies DCT coefficients.
Figure 14A:
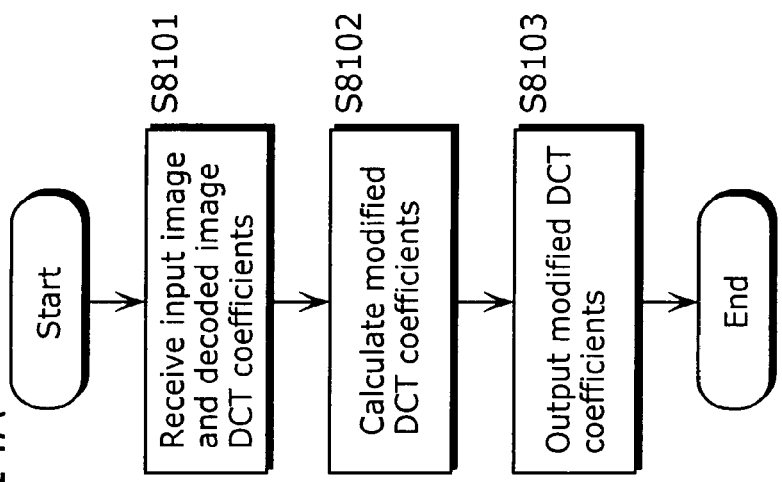
FIG. 14A is a flowchart showing a sequence of basic operations performed by the coefficient modification unit when it modifies DCT coefficients.

FIG. 14A is a flowchart showing a sequence of basic operations performed by the coefficient modification unit 709 when it modifies DCT coefficients.

When receiving the coefficient modification information 703 and the decoded image DCT coefficients 708 (Step S8101), the coefficient modification unit 709 calculates the modified DCT coefficients 710 based on the coefficient modification information 703 and the decoded image DCT coefficients 708 (Step S8102). Then, the coefficient modification unit 709 outputs the calculated modified DCT coefficients (Step S8103).

The inverse orthogonal transformation unit 711 outputs an output image 712 by performing inverse discrete cosine transform on the modified DCT coefficients 710.

As described above, by performing discrete cosine transform on a decoded image signal, modifying DCT coefficients using coefficient modification information and performing inverse discrete cosine transform on the modified DCT coefficients, the quality of a decoded image signal can be improved.

Next, the operations of the coefficient modification unit including a judgment about resolution conversion will be described. It is assumed here that resolution conversion means enhancing a resolution twice as high as the original one both vertically and horizontally.

Figure 15A:
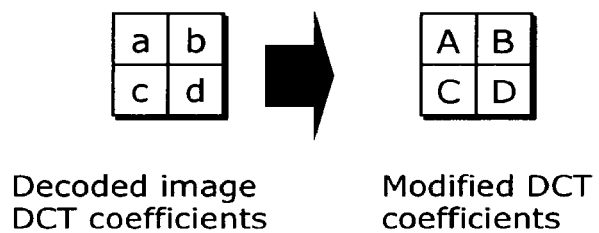
FIGS. 15A to 15C are diagrams for explaining how to calculate modified DCT coefficients, and specifically.
Figure 15B:
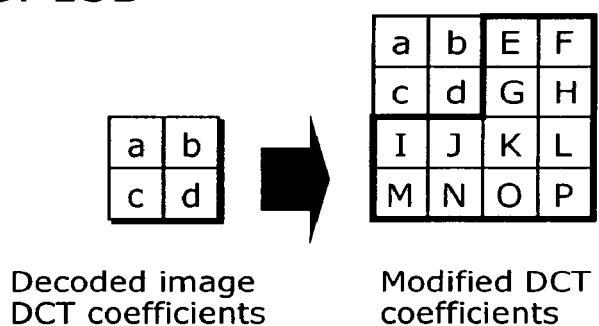
Figure 15C:
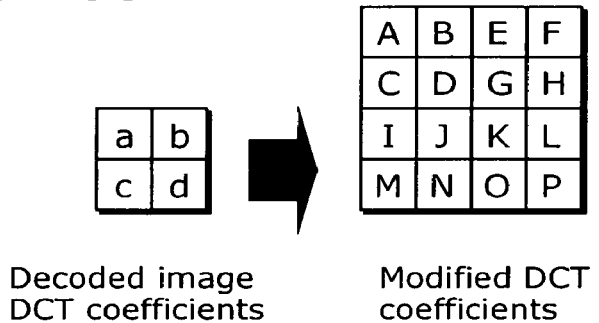

FIG. 14B is a flowchart showing a sequence of basic operations, including a judgment about resolution conversion, performed by the coefficient modification unit 709 when it modifies DCT coefficients. FIGS. 15A to 15C are diagrams for explaining how to calculate modified DCT coefficients. More specifically, FIG. 15A shows an example where resolution conversion is not performed; FIG. 15B shows an example where resolution conversion is performed without information for modifying decoded image DCT coefficients being included in coefficient modification information; and FIG. 15C shows an example where resolution conversion is performed with information for modifying decoded image DCT coefficients being included in coefficient modification information. In FIGS. 15A to 15C, decoded image DCT coefficients are shown on the left side, while modified DCT coefficients are shown on the right side.

When receiving the coefficient modification information 703 and the decoded image DCT coefficients 708 (Step S8201), the coefficient modification unit 709 judges whether or not information about resolution conversion is included in coefficient modification information (Step S8202). When the information about resolution conversion is included in the coefficient modification information, or it is predetermined to perform resolution conversion (Yes in Step S8202), the coefficient modification unit 709 generates, based on the coefficient modification information 703 and the decoded image DCT coefficients 708, high-frequency DCT coefficients E to P which are not contained in the decoded image DCT coefficients 708 (Step S8203). The coefficient modification unit 709 further modifies the decoded image DCT coefficients using the coefficient modification information, and calculates low-frequency DCT coefficients A to D (Step S8204). Then, the coefficient modification unit 709 outputs the generated and modified DCT coefficients A to P (Step S8206). Note that when the information for modifying the decoded image DCT coefficients is not included, the coefficient modification unit 709 does not calculate the low-frequency DCT coefficients A to D. Instead, it outputs modified DCT coefficients consisting of the decoded image DCT coefficients a to d and the generated DCT coefficients E to P, as shown in FIG. 15B.

On the other hand, when resolution conversion is not performed (No in Step S8202), the decoded image DCT coefficients are modified using the coefficient modification information as shown in FIG. 15A (Step S8305), and the modified DCT coefficients are outputted (Step S8206).

As described above, by generating DCT coefficients based on coefficient modification information using information about resolution, resolution conversion can be performed for higher image quality and thus the quality of a decoded image signal can be enhanced.

Next, the specific operations of the coefficient modification unit 709 will be described for the respective cases where the coefficient modification information 105 includes: grouping information of DCT coefficients; linear prediction coefficients; and correlation information, as described in the first embodiment.

Figure 16A:
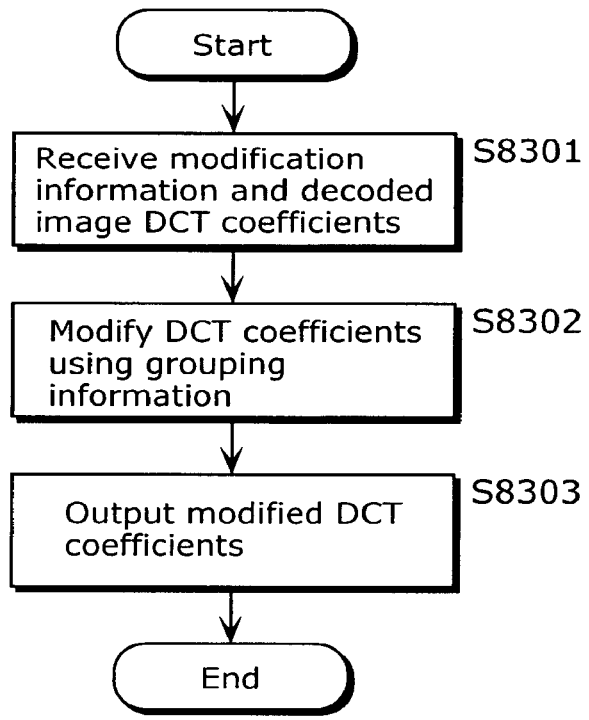
FIG. 16A is a flowchart showing a sequence of operations performed when coefficient modification information includes grouping information of DCT coefficients.
Figure 16B:
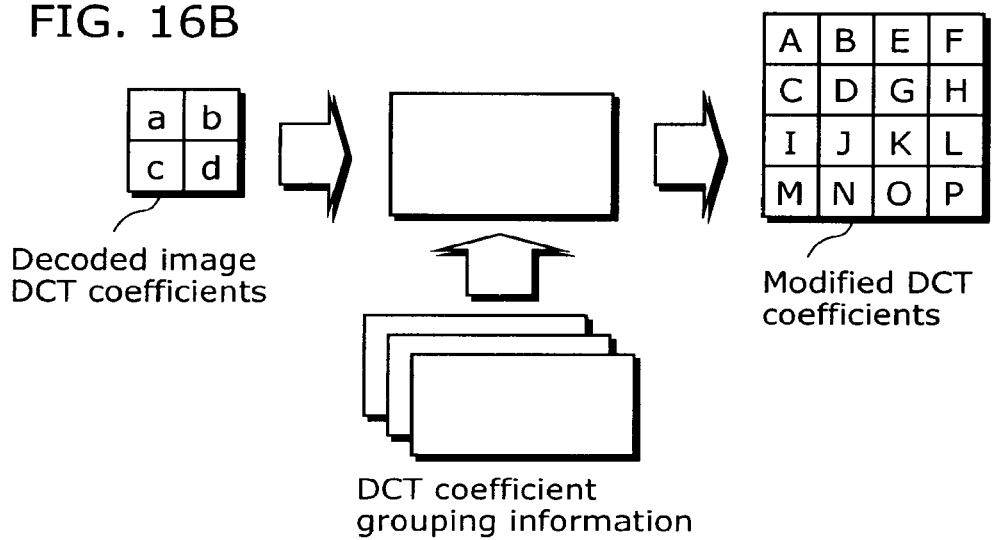
FIG. 16B is a diagram for explaining how to modify the DCT coefficients using the grouping information.

FIG. 16A is a flowchart showing a sequence of operations performed when the coefficient modification information 105 includes grouping information of DCT coefficients, and FIG. 16B is a diagram for explaining how to modify the DCT coefficients using the grouping information.

In this case, when receiving the coefficient modification information 703 and the decoded image DCT coefficients 708 (Step S8301), the coefficient modification unit 709 obtains grouping information of DCT coefficients from the coefficient modification information. Next, the coefficient modification unit 709 predicts, based on the decoded image DCT coefficients 708, determines a threshold value TH(X) for each frequency band of DCT coefficients by predicting the curve R and the curve R' as shown in FIG. 4D, as is the case with the video coding apparatus 100 in the above first embodiment. Next, the modification information generation unit 104 calculates modified DCT coefficients by the following Equation 3 using the grouping information and the threshold value TH(X) (Step S8302). Note that Equation 3 shows an example of grouping into three.

(Grouping α)COEFF(X)=TH(X)×α

(Grouping β)COEFF(X)=−TH(X)×α

(Grouping γ)COEFF(X)=0   (Equation 3)

where COEFF(X) denotes a DCT coefficient of a location X, and TH(X) denotes a predetermined threshold value corresponding to the location X, and α denotes a constant.

Then, the modification information generation unit 104 outputs the calculated DCT coefficients as modified DCT coefficients (Step S8303).

Note that when a threshold value TH(X) is included in coefficient modification information, it does not need to be determined from decoded image DCT coefficients 708. The value of a constant α may vary from block to block to be DCT-processed. In this case, the quality of the decoded image can be enhanced.

In the case where grouping information of DCT coefficients is obtained as a code as described in the modification 1 of the above first embodiment, grouping of DCT coefficients is identified so as to calculate modified DCT coefficients by referring to the first grouping table as shown in FIG. 5A, the second grouping table as shown in FIG. 5B and the code table as shown in FIG. 5C.

Figure 17A:
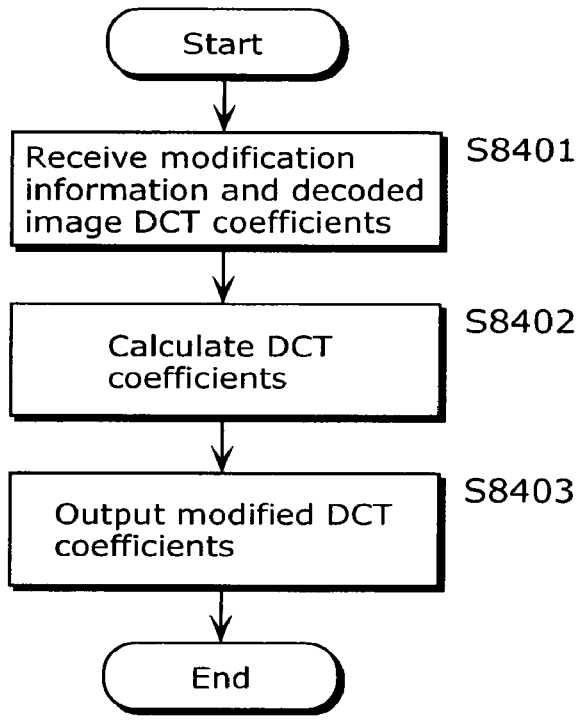
FIG. 17A is a flowchart showing a sequence of operations performed when the coefficient modification information includes linear prediction coefficients.
Figure 17B:
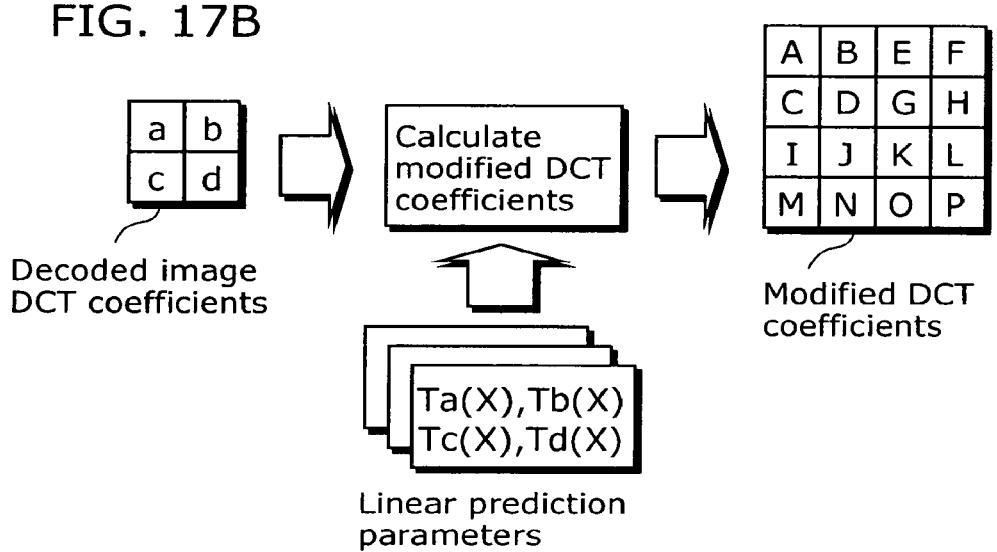
FIG. 17B is a diagram for explaining how to modify the DCT coefficients using the linear prediction coefficients.

FIG. 17A is a flowchart showing a sequence of operations performed when the coefficient modification information 105 includes linear prediction coefficients, and FIG. 17B is a diagram for explaining how to modify the DCT coefficients using the linear prediction coefficients.

In this case, when receiving the coefficient modification information 703 and the decoded image DCT coefficients 708 (Step S8401), the coefficient modification unit 709 obtains, from the coefficient modification information, linear prediction coefficients to be multiplied by respective decoded image DCT coefficients. Next, the coefficient modification unit 709 calculates the modified DCT coefficients by the following Equation 4 using these linear prediction coefficients (Step S8402).

$$A = Ta(A) \times a + Tb(A) \times b + Tc(A) \times c + Td(A) \times d$$
$$B = Ta(B) \times a + Tb(B) \times b + Tc(B) \times c + Td(B) \times d$$
$$\ldots$$
$$P = Ta(P) \times a + Tb(P) \times b + Tc(P) \times c + Td(P) \times d$$

(Equation 4)

where Ta(X) to Td(X) denote linear prediction coefficients at a location X.

Then, the modification information generation unit 104 outputs the calculated DCT coefficients as modified DCT coefficients (Step S8403).

Note that in the case where grouping is performed in the same manner as described in the modification 2 of the first embodiment and the coefficient modification information includes block integration information, grouping is performed using this block integration information, Ta(X) to Td(X) included in each group are obtained, and DCT coefficients are modified.

In the case where it is predetermined that grouping is to be performed, the method as described in FIG. 7D in the modification 2 of the first embodiment is to be used, and the coefficient modification information does not include block integration information, grouping is performed in the same manner as described in FIG. 7D in the modification 2 of the first embodiment, Ta(X) to Td(X) included in each group are obtained, and DCT coefficients are modified.

Figure 18A:
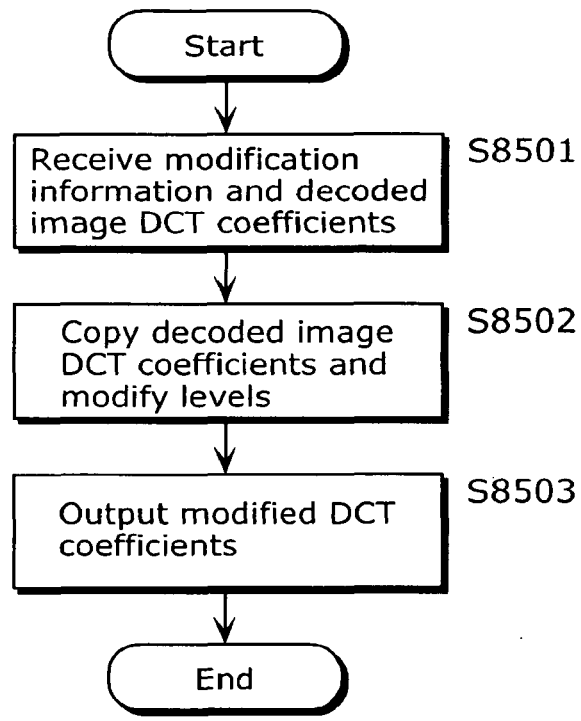
FIG. 18A is a flowchart showing a sequence of operations performed when the coefficient modification information includes correlation information.
Figure 18B:
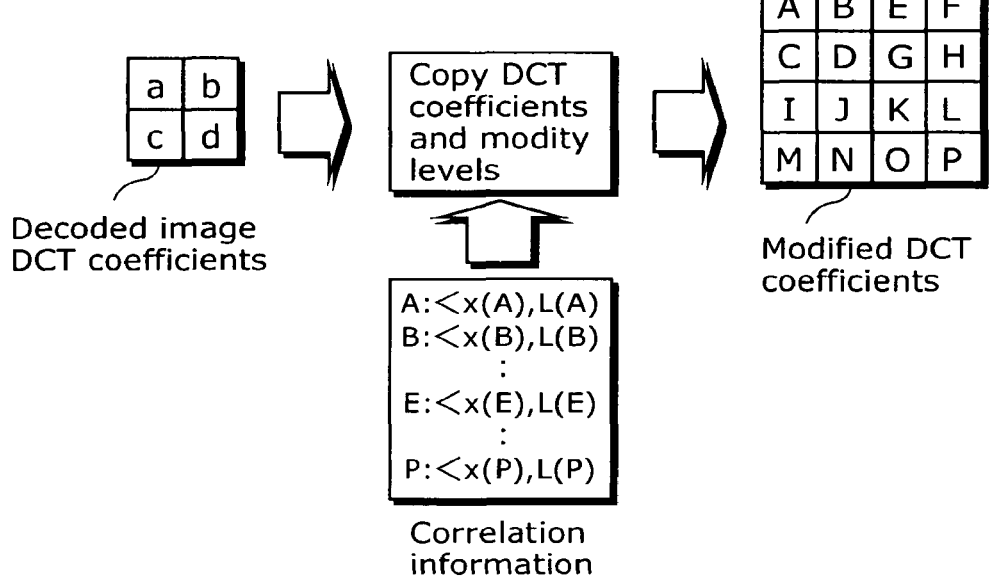
FIG. 18B is a diagram for explaining how to modify the DCT coefficients using the correlation information.

FIG. 18A is a flowchart showing a sequence of operations performed when the coefficient modification information 105 includes correlation information, and FIG. 18B is a diagram for explaining how to modify DCT coefficients using the correlation information.

In this case, when receiving the coefficient modification information 703 and the decoded image DCT coefficients 708 (Step S8401), the coefficient modification unit 709 obtains, from the coefficient modification information, information of a specified area, correlation information x(X) between decoded DCT coefficients within the area, and modification level information L(X). This means that a modified DCT coefficient located at a coefficient location X is in correlation with a decoded image DCT coefficient x and its modification level is L(X). For example, in the case where a modified DCT coefficient located at a coefficient location P is in correlation with a decoded image DCT coefficient b and information indicating that its modification level is L(P) is included in coefficient modification information, the modified DCT coefficient located at the coefficient location P is calculated by the following Equation 5.

$$P = L(P) \times b(P)$$   (Equation 5)

As described above, the coefficient modification unit 709 performs processing, on all the DCT coefficients, of copying a decoded image DCT coefficient which is in correlation with a DCT coefficient to be modified and modifying its level (Step S8502).

Then, the modification information generation unit 104 outputs the modified DCT coefficients calculated as mentioned above (Step S8403).

As described above, by modifying decoded image DCT coefficients by coefficient modification information, a higher-quality decoded image can be obtained.

Note that the present embodiment describes, using diagrams, the case where a resolution is converted to a resolution twice as high as the original one both vertically and horizontally, but such resolution conversion does not always need to be performed. The increase ratio of resolution is not limited to this ratio.

The processing methods for various types of coefficient modification information are described one by one, but only one processing method is not always performed on one type of coefficient modification information. It is possible to perform the processing for modifying DCT coefficients depending on the coefficient modification information by switching the processing based on the information identifying the type of the coefficient modification information.

Third Embodiment

Furthermore, the processing described in each of the above embodiments can easily be carried out by an independent computer system by recording a program for implementing the video coding method and the video decoding method as described in each of the above embodiments onto a recording medium such as a flexible disk or the like.

Figure 19A:
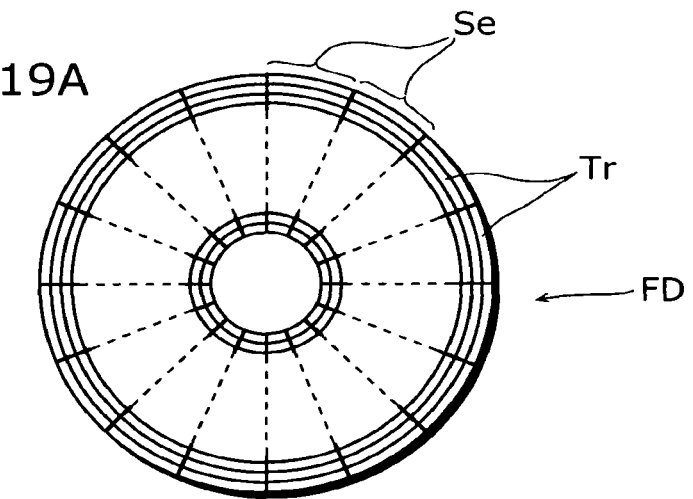
FIGS. 19A, 19B and 19C are diagrams for explaining a recording medium on which a program for implementing in a computer system the video coding method and the video decoding method described in each of the above embodiments is recorded (Third Embodiment), and specifically.
Figure 19B:
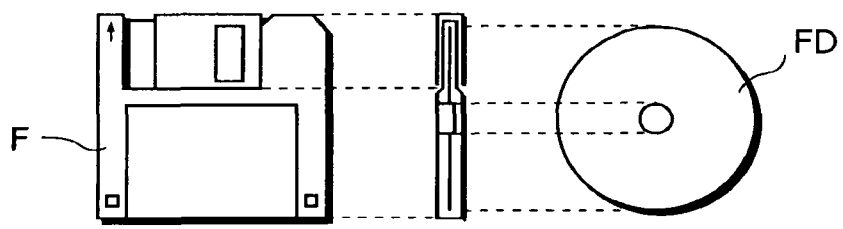
Figure 19C:
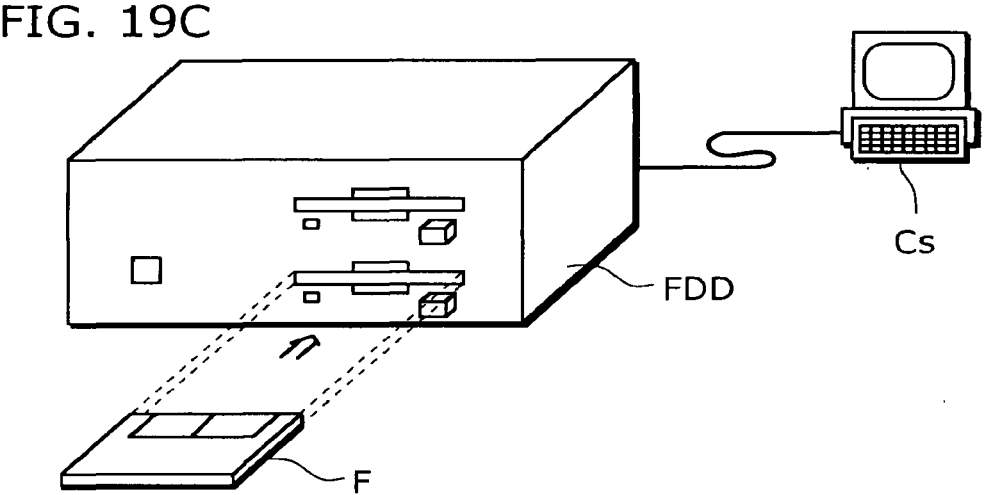

FIGS. 19A, 19B, and 19C are descriptive diagrams of a recording medium such as a flexible disk or the like, on which a program for implementing the video coding method and the video decoding method as described in each of the above embodiments in a computer system is recorded.

FIG. 19B shows a full appearance of a flexible disk, its structure at a cross section and a full appearance of the flexible disk itself, whereas FIG. 19A shows an example of a physical format of the flexible disk as a main body of a recording medium. The flexible disk FD is contained in a case F and has a plurality of tracks Tr formed concentrically from the periphery to the inside on the surface thereof, and each track is divided into 16 sectors Se in the angular direction. Thus, the program mentioned above is recorded in an area assigned for it on the flexible disk FD.

FIG. 19C shows a structure for recording and reproducing the program on and from the flexible disk FD. When the program for implementing the video coding method and the video decoding method is recorded on the flexible disk FD, the computer system Cs writes the program therein via a flexible disk drive. When the video coding method and the video decoding method are constructed in the computer system Cs using the program recorded on the flexible disk FD, the program is read out from the flexible disk and then transferred to the computer system Cs through the flexible disk drive.

In the above description, the flexible disk is used as an example of a recording medium, but the same processing can also be performed using an optical disk. In addition, the recording medium is not limited to these mentioned above, but any other medium capable of recording a program such as an IC card and a ROM cassette can be employed.

Fourth Embodiment

The following is a description for the application of the video coding method and the video decoding method illustrated in each of the above-mentioned embodiments and a system using these methods.

Figure 20:
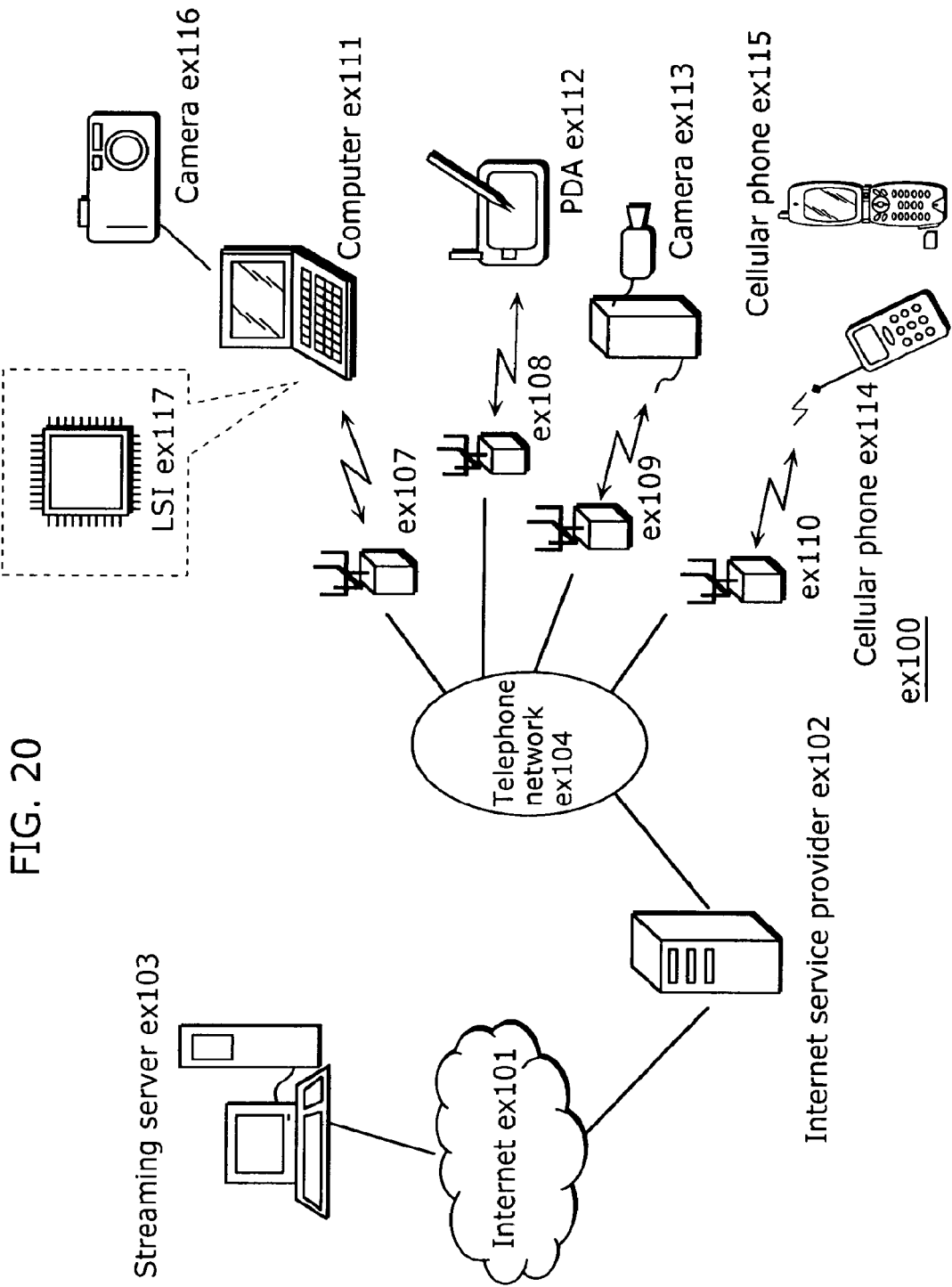
FIG. 20 is a block diagram showing an overall configuration of a content supply system (Fourth Embodiment).

FIG. 20 is a block diagram showing an overall configuration of a content providing system ex100 for realizing content distribution services. The area for providing communication services is divided into cells of desired size, and base stations ex107 to ex110, which are fixed wireless stations, are placed in respective cells. This content providing system ex100 is connected to devices such as a computer ex111, a personal digital assistant (PDA) ex112, a camera ex113, a cellular phone ex114 and a camera-equipped cellular phone ex115 and the like via, for example, the Internet ex101, an Internet service provider ex102, a telephone network ex104, as well as the base stations ex107 to ex110.

However, the configuration of the content providing system ex100 is not limited to the configuration shown in FIG. 20; a combination in which any of the elements are connected is acceptable. In addition, each device may be directly connected to the telephone network ex104, rather than via the base stations ex107 to ex110 which are the fixed wireless stations.

The camera ex113 is a device such as a digital video camera or the like which is capable of shooting video. The cellular phone may be the one that meets any of the standards such as Personal Digital Communications (PDC), Code Division Multiple Access (CDMA), Wideband-Code Division Multiple Access (W-CDMA), Global System for Mobile Communications (GSM), Personal Handyphone System (PHS), or the like.

A streaming server ex103 is connected to the camera ex113 via the telephone network ex104 and also the base station ex109, which realizes a live distribution or the like using the camera ex113 based on the coded data transmitted from the user. Either of the camera ex113 or the server or the like which transmits the data may code the data. The video data shot by a camera ex116 may be transmitted to the streaming server ex103 via the computer ex111. The camera ex 116 is a device such as a digital camera which is capable of shooting still and moving pictures. In this case, either the camera ex116 or the computer ex111 may code the video data. An LSI ex117 included in the computer ex111 or the camera ex116 performs the coding processing. Software for coding and decoding images may be integrated into some type of storage medium (such as a CD-ROM, a flexible disk, a hard disk and the like) that is a recording medium which is readable by the computer ex111 or the like. Furthermore, the camera-equipped cellular phone ex115 may transmit the video data. This video data is the data which has been coded by the LSI included in the cellular phone ex115.

The content providing system ex100 codes content (such as a music live video) shot by a user using the camera ex113, the camera ex116 or the like in the same way as shown in the above-mentioned embodiments and transmits it to the streaming server ex103, while the streaming server ex103 carries out stream distribution of the content data to the clients at their requests. The clients include the computer ex111, the PDA ex112, the camera ex113, the cellular phone ex114 and so on capable of decoding the above-mentioned coded data. In the content providing system ex100, the clients can thus receive and reproduce the coded data, and can further receive, decode and reproduce the data in real time so as to realize personal broadcasting.

When each device in this system performs coding or decoding, the image coding apparatus or the image decoding apparatus shown in each of the embodiments can be used.

A cellular phone will be explained as an example of such an apparatus.

Figure 21:
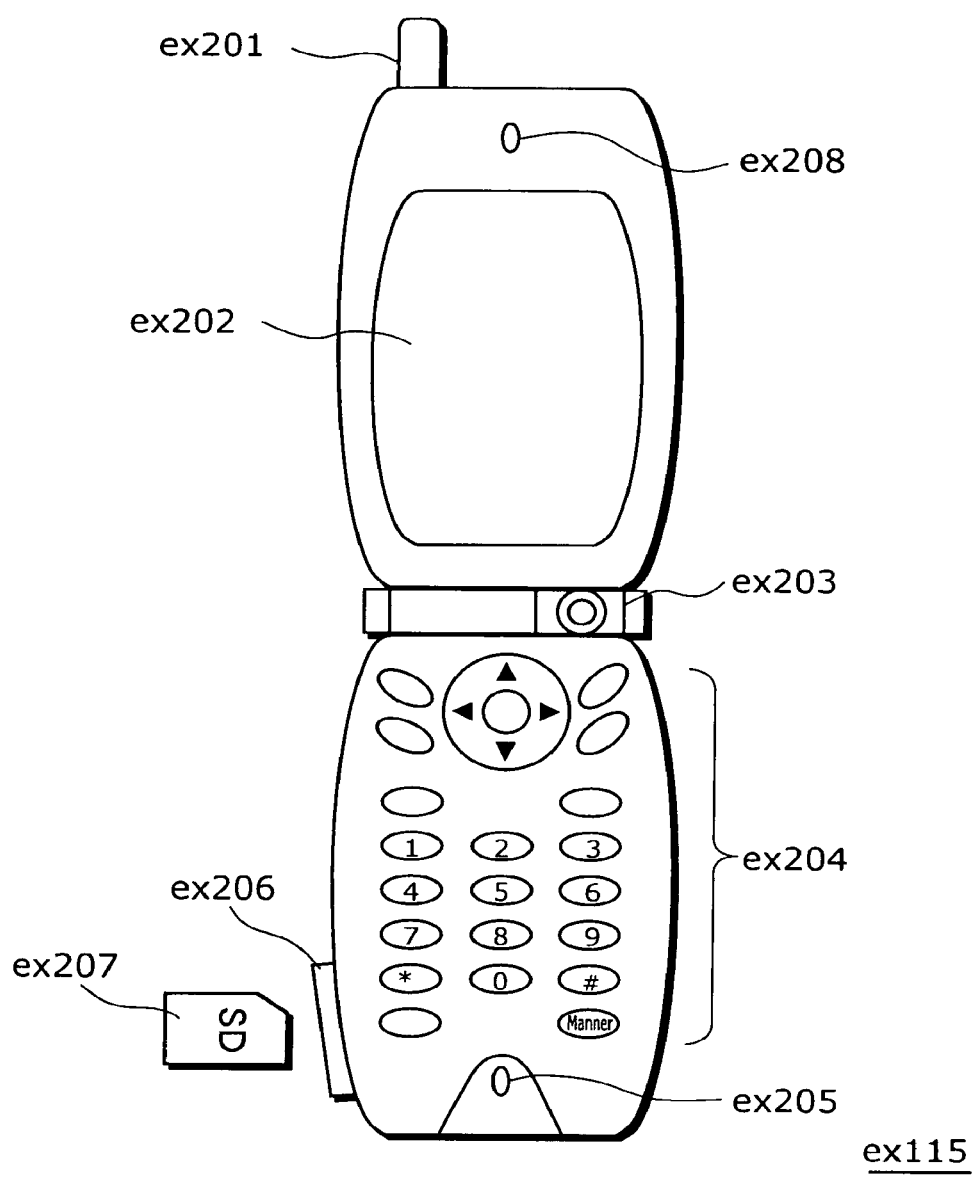
FIG. 21 is a diagram showing an example of a cellular phone that uses a video coding method and a video decoding method (Fourth Embodiment).

FIG. 21 is a diagram showing the cellular phone ex115 that uses the video coding method and the video decoding method described in each of the above embodiments. The cellular phone ex115 includes: an antenna ex201 for communicating with the base station ex110 via radio waves; a camera unit ex203 such as a CCD camera capable of shooting moving and still pictures; a display unit ex202 such as a liquid crystal display for displaying the data such as decoded video and the like shot by the camera unit ex203 or received by the antenna ex201; a main body unit including a set of operation keys ex204; an audio output unit ex208 such as a speaker for outputting audio; an audio input unit ex205 such as a microphone for inputting audio; a recording medium ex207 for recording coded or decoded data such as data of moving or still pictures shot by the camera, data of received e-mail and data of moving or still pictures; and a slot unit ex206 for inserting the recording medium ex207 into the cellular phone ex115. The recording medium ex207 contains, within a plastic case, a flash memory element, which is one type of Electrically Erasable and Programmable Read-Only Memory (EEPROM), which in turn is a non-volatile memory that is electrically rewritable and erasable; for example, an SD Card.

Next, the cellular phone ex115 will be explained with reference to FIG. 22. In the cellular phone ex115, a main control unit ex311, designed in order to control overall each unit of the main body which contains the display unit ex202 as well as the operation keys ex204, is connected mutually, via a synchronous bus ex313, to a power supply circuit unit ex310, an operation input control unit ex304, a picture coding unit ex312, a camera interface unit ex303, a liquid crystal display (LCD) control unit ex302, a picture decoding unit ex309, a multiplexing/demultiplexing unit ex308, a recording/reproducing unit ex307, a modem circuit unit ex306 and an audio processing unit ex305.

When a call-end key or a power key is turned ON by a user's operation, the power supply circuit unit ex310 supplies the respective units with power from a battery pack so as to activate the camera-equipped digital cell phone ex115 so as to put it into a ready state.

In the cellular phone ex115, the audio processing unit ex305 converts the audio signals received by the audio input unit ex205 in conversation mode into digital audio data under the control of the main control unit ex311 made up of a CPU, ROM, RAM, or the like, the modem circuit unit ex306 performs spread spectrum processing for the digital audio data, and the communication circuit unit ex301 performs digital-to-analog conversion and frequency conversion for the data, so as to transmit the resulting data via the antenna ex201. Also, in the cellular phone ex115, the communication circuit unit ex301 amplifies the data received by the antenna ex201 in conversation mode and performs frequency conversion and the analog-to-digital conversion to the data, the modem circuit unit ex306 performs inverse spread spectrum processing of the data, and the audio processing unit ex305 converts it into analog audio data, so as to output the resulting data via the audio output unit ex208.

Furthermore, when transmitting an e-mail in data communication mode, the text data of the e-mail inputted by operating the operation keys ex204 of the main body is sent out to the main control unit ex311 via the operation input control unit ex304. In the main control unit ex311, after the modem circuit unit ex306 performs spread spectrum processing of the text data and the communication circuit unit ex301 performs the digital-to-analog conversion and the frequency conversion for the text data, the resulting data is transmitted to the base station ex110 via the antenna ex201.

When picture data is transmitted in data communication mode, the picture data shot by the camera unit ex203 is supplied to the picture coding unit ex312 via the camera interface unit ex303. When the picture data is not transmitted, it is also possible to display the picture data shot by the camera unit ex203 directly on the display unit ex202 via the camera interface unit ex303 and the LCD control unit ex302.

The picture coding unit ex312, which includes the image coding apparatus as described in the present invention, compresses and codes the picture data supplied from the camera unit ex203 using the coding method employed by the image coding apparatus as shown in each of the embodiments mentioned above, so as to transform it into coded picture data, and sends it out to the multiplexing/demultiplexing unit ex308. At this time, the cellular phone ex115 sends out, as digital audio data, the audio received by the audio input unit ex205 during the shooting with the camera unit ex203 to the multiplexing/demultiplexing unit ex308 via the audio processing unit ex305.

The multiplexing/demultiplexing unit ex308 multiplexes the coded picture data supplied from the picture coding unit ex312 and the audio data supplied from the audio processing unit ex305, using a predetermined method, then the modem circuit unit ex306 performs spread spectrum processing of the multiplexed data obtained as a result of the multiplexing, and lastly the communication circuit unit ex301 performs digital-to-analog conversion and frequency conversion of the resulting data for the transmission via the antenna ex201.

When receiving data of a video file which is linked to a Web page or the like in data communication mode, the modem circuit unit ex306 performs inverse spread spectrum processing for the data received from the base station ex110 via the antenna ex201, and sends out the multiplexed data obtained as a result of the inverse spread spectrum processing to the demultiplexing unit ex308.

In order to decode the multiplexed data received via the antenna ex201, the multiplexing/demultiplexing unit ex308 demultiplexes the multiplexed data into a coded bit stream of video data and that of audio data, and supplies the coded video data to the picture decoding unit ex309 and the audio data to the audio processing unit ex305, respectively, via the synchronous bus ex313.

Next, the picture decoding unit ex309, including the image decoding apparatus as described for the present invention, decodes the coded bit stream of the video data using the decoding method corresponding to the coding method as shown in each of the above-mentioned embodiments so as to generate reproduced video data, and supplies this data to the display unit ex202 via the LCD control unit ex302, and thus the video data included in the video file linked to the Web page, for instance, is displayed. At the same time, the audio processing unit ex305 converts the audio data into analog audio data, and supplies this data to the audio output unit ex208, and thus the audio data included in the video file linked to the Web page, for instance, is reproduced.

Figure 23:
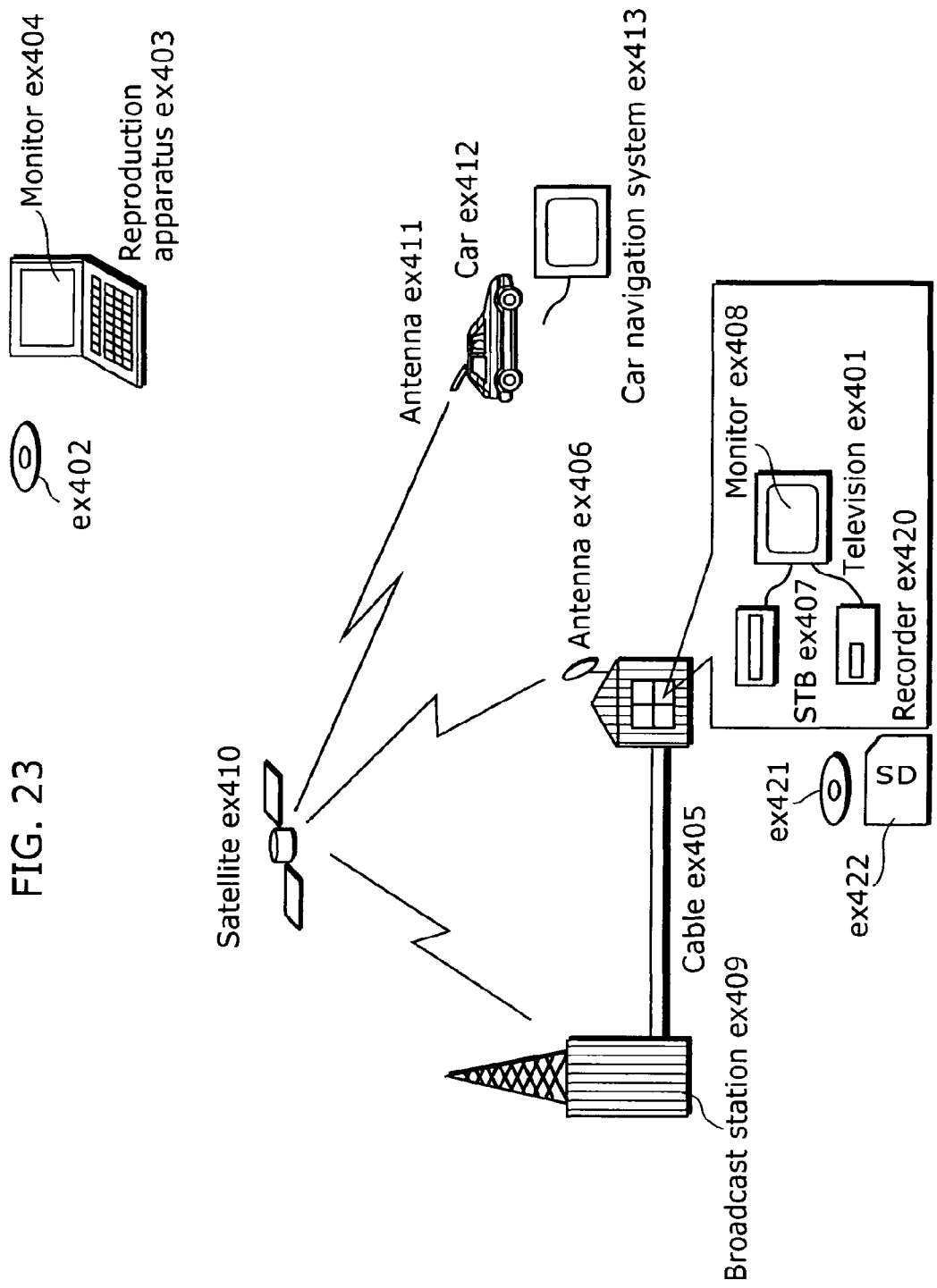
FIG. 23 is an example of a digital broadcast system (Fourth Embodiment).

The present invention is not limited to the above-mentioned system since terrestrial or satellite digital broadcasting has been in the news lately and at least either the image coding apparatus or the image decoding apparatus described in each of the above-mentioned embodiments can be incorporated into a digital broadcasting system as shown in FIG. 23. More specifically, a coded bit stream of video information is transmitted from a broadcast station ex409 to or communicated with a broadcast satellite ex410 via radio waves. Upon receipt of the bit stream, the broadcast satellite ex410 transmits radio waves for broadcasting. Then, a home-use antenna ex406 with a satellite broadcast reception function receives the radio waves, and a television (receiver) ex401 or a set top box (STB) ex407 decodes a coded bit stream for reproduction. The image decoding apparatus as shown in each of the above-mentioned embodiments can be implemented in the reproduction apparatus ex403 for reading and decoding the coded bit stream recorded on a recording medium ex402 such as a CD, a DVD or the like. In this case, the reproduced video signals are displayed on a monitor ex404. It is also conceivable to implement the image decoding apparatus in the set top box ex407 connected to a cable ex405 for a cable television or an antenna ex406 for satellite and/or terrestrial broadcasting, so as to reproduce them on a monitor ex408 of the television ex401. The image decoding apparatus may be incorporated into the television, not in the set top box. Also, a car ex412 having an antenna ex411 can receive signals from the satellite ex410 or the base station ex107 for reproducing video on a display device such as a car navigation system ex413 set in the car ex412.

Furthermore, the image coding apparatus as shown in each of the above-mentioned embodiments can code image signals and record them on the recording medium. Specific examples of such an apparatus are a recorder ex420 such as a DVD recorder for recording image signals on a DVD disc ex421 and a disk recorder for recording them on a hard disk. The image signals can also be recorded on an SD card ex422. When the recorder ex420 includes the image decoding apparatus as shown in each of the above-mentioned embodiments, the image signals recorded on the DVD disc ex421 or the SD card ex422 can be reproduced for display on the monitor ex408.

Figure 22:
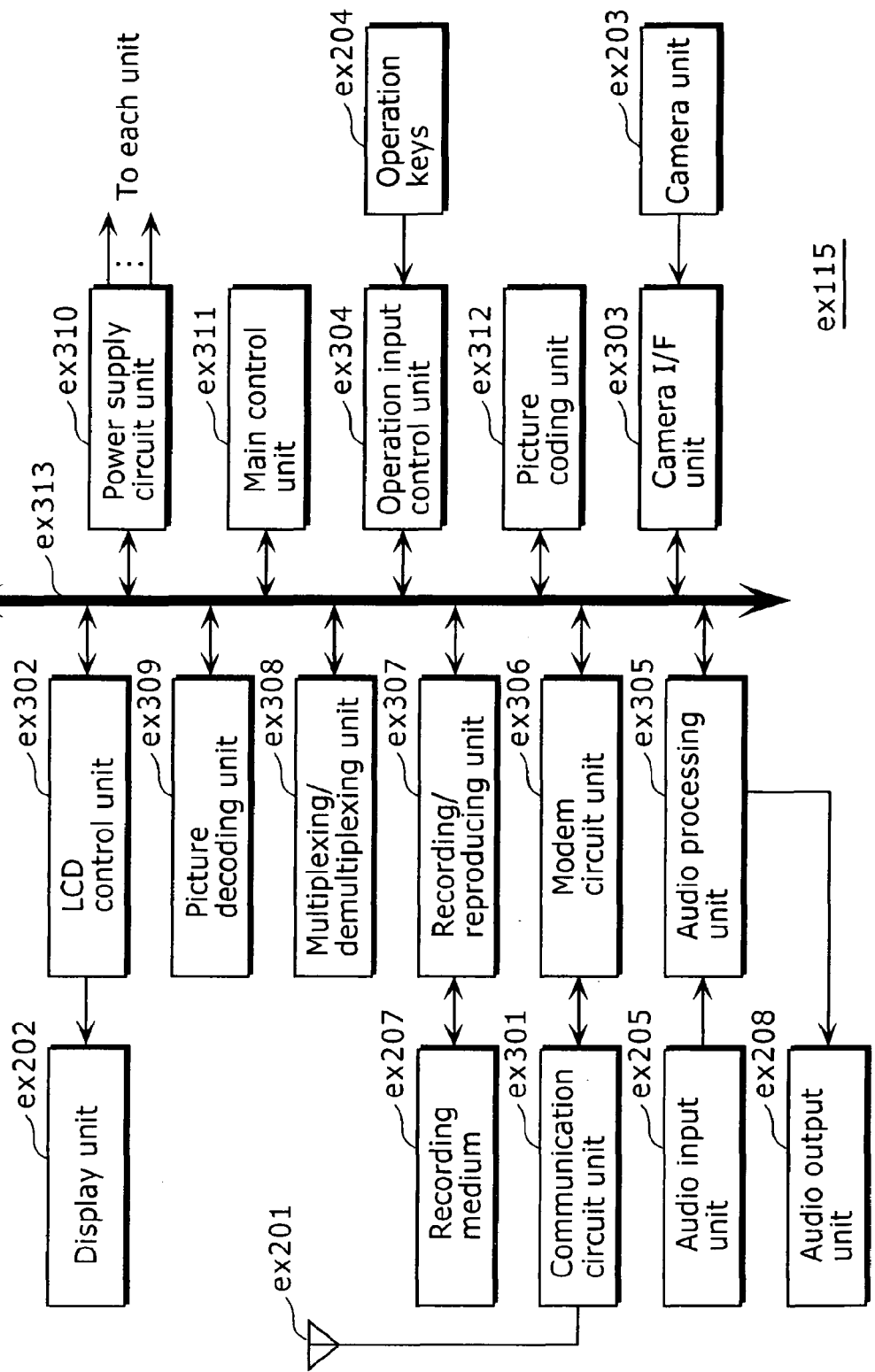
FIG. 22 is a block diagram of a cellular phone (Fourth Embodiment).

As for the structure of the car navigation system ex413, the structure without the camera unit ex203, the camera interface unit ex303 and the picture coding unit ex312, out of the elements shown in FIG. 22, is conceivable. The same applies to the computer ex111, the television (receiver) ex401 and others.

In addition, three types of implementations can be conceived for a terminal such as the cellular phone ex114: a sending/receiving terminal implemented with both an encoder and a decoder; a sending terminal implemented with an encoder only; and a receiving terminal implemented with a decoder only.

As described above, it is possible to use the video coding method and the video decoding method described in each of the above-mentioned embodiments for any of the above-mentioned devices and systems, and by thus doing, the effects described in the above-mentioned embodiments can be obtained.

Note that the present invention is not limited to the embodiments as described above, and various variations and modifications thereof are possible without departing from the scope of the present invention.

Each functional block shown in the block diagrams of FIGS. 1, 11 and 13 is embodied as an LSI which is typically an integrated circuit. Each of these blocks can be in plural single-function LSIs, or also can be in one integrated LSI including a part or all of these functions. (For example, the functional blocks other than a memory may be integrated into one chip).

Here, the circuit is called LSI, but there are also cases where, depending on an integration degree, the circuit is called IC, system LSI, super LSI, or ultra LSI.

Moreover, ways to achieve integration are not limited to the LSI, and a dedicated circuit or a general purpose processor and so forth can also achieve the integration. A Field Programmable Gate Array (FPGA) that can be programmed after manufacturing LSI or a reconfigurable processor that allows reconfiguration of the connection or setup of circuit cells inside the LSI can be used for the same purpose.

In the future, with advancement in semiconductor technology or another technology derived therefrom, a brand-new integration technology may replace LSI. The integration can be carried out by that technology. Application of biotechnology is one such possibility.

INDUSTRIAL APPLICABILITY

The video coding method and the video decoding method according to the present invention has an effect of achieving high-quality coding and decoding at a low bit rate, and are useful as a video coding method and a video decoding method for storage, transmission, communication and the like using, for example, cellular phones, DVD devices, personal computers and the like.

The invention claimed is:

1. A video decoding method for decoding a coded bit stream obtained by compressing and coding a video signal, said method comprising:

obtaining, as additional information of the coded bit stream, coefficient modification information used for modifying orthogonal transformation coefficients obtained by performing an orthogonal transformation on a decoded video signal obtained from the coded bit stream;

generating a first video signal by decoding the coded bit stream;

obtaining decoded orthogonal transformation coefficients by performing an orthogonal transformation on the first video signal;

calculating modified orthogonal transformation coefficients based on the coefficient modification information and the decoded orthogonal transformation coefficients; and outputting a second video signal obtained by performing an inverse orthogonal transformation on the modified orthogonal transformation coefficients, wherein the coefficient modification information indicates to which range of values, out of a predetermined number of ranges of values, each of the orthogonal transformation coefficients belongs, and wherein said calculating of the modified orthogonal transformation coefficients includes calculating the modified orthogonal transformation coefficients based on a predetermined threshold value and the information that indicates to which range of values, out of the predetermined number of ranges of values, each of the orthogonal transformation coefficients belongs.

2. The video decoding method according to claim 1, wherein said calculating of the modified orthogonal transformation coefficients includes:

determining a threshold value based on the decoded orthogonal transformation coefficients.

3. The video decoding method according to claim 1, wherein said calculating of the modified orthogonal transformation coefficients includes calculating, as the modified orthogonal transformation coefficients, an increased number of orthogonal transformation coefficients by generating a predetermined number of unknown orthogonal transformation coefficients from the orthogonal transformation coefficients using the coefficient modification information, and wherein said outputting of the second video signal includes outputting, as the second video signal, a video signal of a predetermined increased-resolution by performing inverse orthogonal transformation on the modified orthogonal transformation coefficients.

4. A video decoding method for decoding a coded bit stream obtained by compressing and coding a video signal, said method comprising:

obtaining, as additional information of the coded bit stream, coefficient modification information used for modifying orthogonal transformation coefficients obtained by performing an orthogonal transformation on a decoded video signal obtained from the coded bit stream;

generating a first video signal by decoding the coded bit stream;

obtaining decoded orthogonal transformation coefficients by performing an orthogonal transformation on the first video signal;

calculating modified orthogonal transformation coefficients based on the coefficient modification information and the decoded orthogonal transformation coefficients; and outputting a second video signal obtained by performing an inverse orthogonal transformation on the modified orthogonal transformation coefficients, wherein the coefficient modification information is linear prediction coefficients for predicting the orthogonal transformation coefficients that should be calculated, and wherein said calculating of the modified orthogonal transformation coefficients includes calculating the modified orthogonal transformation coefficients from the decoded orthogonal transformation coefficients using the linear prediction coefficients.

5. The video decoding method according to claim 4, wherein said calculating of the modified orthogonal transformation coefficients includes calculating, as the modified orthogonal transformation coefficients, an increased number of orthogonal transformation coefficients by generating a predetermined number of unknown orthogonal transformation coefficients from the orthogonal transformation coefficients using the coefficient modification information, and wherein said outputting of the second video signal includes outputting, as the second video signal, a video signal of a predetermined increased-resolution by performing inverse orthogonal transformation on the modified orthogonal transformation coefficients.

6. A video decoding apparatus that decodes a coded bit stream obtained by compressing and coding a video signal, said apparatus comprising:

a decoding unit configured to generate a first video signal by decoding the coded bit stream;

an orthogonal transformation unit configured to obtain decoded orthogonal transformation coefficients by performing an orthogonal transformation on the first video signal;

a coefficient modification unit configured to obtain, as additional information of the coded bit stream, coefficient modification information used for modifying orthogonal transformation coefficients obtained by performing an orthogonal transformation on a decoded video signal obtained from the coded bit stream, and to calculate modified orthogonal transformation coefficients based on the coefficient modification information and the decoded orthogonal transformation coefficients; and an inverse orthogonal transformation unit configured to output a second video signal obtained by performing an inverse orthogonal transformation on the modified orthogonal transformation coefficients, wherein the coefficient modification information indicates to which range of values, out of a predetermined number of ranges of values, each of the orthogonal transformation coefficients belongs, and wherein said coefficient modification unit calculates the modified orthogonal transformation coefficients based on a predetermined threshold value and the information that indicates to which range of values, out of the predetermined number of ranges of values, each of the orthogonal transformation coefficients belongs.

7. A video decoding apparatus that decodes a coded bit stream obtained by compressing and coding a video signal, said apparatus comprising:

a decoding unit configured to generate a first video signal by decoding the coded bit stream;

an orthogonal transformation unit configured to obtain decoded orthogonal transformation coefficients by performing an orthogonal transformation on the first video signal;

a coefficient modification unit configured to obtain, as additional information of the coded bit stream, coefficient modification information used for modifying orthogonal transformation coefficients obtained by performing an orthogonal transformation on a decoded video signal obtained from the coded bit stream, and to calculate modified orthogonal transformation coefficients based on the coefficient modification information and the decoded orthogonal transformation coefficients; and an inverse orthogonal transformation unit configured to output a second video signal obtained by performing an inverse orthogonal transformation on the modified orthogonal transformation coefficients, wherein the coefficient modification information is linear prediction coefficients for predicting the orthogonal transformation coefficients from the temporarily decoded orthogonal transformation coefficients, and wherein said coefficient modification unit calculates the modified orthogonal transformation coefficients from the decoded orthogonal transformation coefficients using the linear prediction coefficients.

8. A non-transitory computer-readable recording medium having a program recorded thereon, the program being for decoding a coded bit stream obtained by compressing and coding a video signal, the program recording medium causing a computer to execute a method comprising:

obtaining, as additional information of the coded bit stream, coefficient modification information used for modifying orthogonal transformation coefficients obtained by performing an orthogonal transformation on a decoded video signal obtained from the coded bit stream;

generating a first video signal by decoding the coded bit stream;

obtaining decoded orthogonal transformation coefficients by performing an orthogonal transformation on the first video signal;

calculating modified orthogonal transformation coefficients based on the coefficient modification information and the decoded orthogonal transformation coefficients; and outputting a second video signal obtained by performing an inverse orthogonal transformation on the modified orthogonal transformation coefficients, wherein the coefficient modification information is information that indicates to which range of values, out of a predetermined number of ranges of values, each of the orthogonal transformation coefficients belongs, and wherein said calculating of the modified orthogonal transformation coefficients includes calculating the modified orthogonal transformation coefficients based on a predetermined threshold value and the information that indicates to which range of values, out of the predetermined number of ranges of values, each of the orthogonal transformation coefficients belongs.

9. A non-transitory computer-readable recording medium having a program recorded thereon, the program being for decoding a coded bit stream obtained by compressing and coding a video signal, the program causing a computer to execute a method comprising:

obtaining, as additional information of the coded bit stream, coefficient modification information used for modifying orthogonal transformation coefficients obtained by performing an orthogonal transformation on a decoded video signal obtained from the coded bit stream;

generating a first video signal by decoding the coded bit stream;

obtaining decoded orthogonal transformation coefficients by performing an orthogonal transformation on the first video signal;

calculating modified orthogonal transformation coefficients based on the coefficient modification information and the decoded orthogonal transformation coefficients; and outputting a second video signal obtained by performing an inverse orthogonal transformation on the modified orthogonal transformation coefficients, wherein the coefficient modification information is linear prediction coefficients for predicting the orthogonal transformation coefficients from the temporarily decoded orthogonal transformation coefficients, and wherein said calculating of the modified orthogonal transformation coefficients includes calculating the modified orthogonal transformation coefficients from the decoded orthogonal transformation coefficients using the linear prediction coefficients.

10. An integrated circuit that decodes a coded bit stream obtained by compressing and coding a video signal, said integrated circuit comprising:

a decoding unit configured to generate a first video signal by decoding the coded bit stream;

an orthogonal transformation unit configured to obtain decoded orthogonal transformation coefficients by performing an orthogonal transformation on the first video signal;

a coefficient modification unit configured to obtain, as additional information of the coded bit stream, coefficient modification information used for modifying orthogonal transformation coefficients obtained by performing an orthogonal transformation on a decoded video signal obtained from the coded bit stream, and to calculate modified orthogonal transformation coefficients based on the coefficient modification information and the decoded orthogonal transformation coefficients; and an inverse orthogonal transformation unit configured to output a second video signal obtained by performing an inverse orthogonal transformation on the modified orthogonal transformation coefficients, wherein the coefficient modification information is information that indicates to which range of values, out of a predetermined number of ranges of values, each of the orthogonal transformation coefficients belongs, and wherein said coefficient modification unit calculates the modified orthogonal transformation coefficients based on a predetermined threshold value and the information that indicates to which range of values, out of the predetermined number of ranges of values, each of the orthogonal transformation coefficients belongs.

11. An integrated circuit that decodes a coded bit stream obtained by compressing and coding a video signal, said integrated circuit comprising:

a decoding unit configured to generate a first video signal by decoding the coded bit stream;

an orthogonal transformation unit configured to obtain decoded orthogonal transformation coefficients by performing an orthogonal transformation on the first video signal;

a coefficient modification unit configured to obtain, as additional information of the coded bit stream, coefficient modification information used for modifying orthogonal transformation coefficients obtained by performing an orthogonal transformation on a decoded video signal obtained from the coded bit stream, and to calculate modified orthogonal transformation coefficients based on the coefficient modification information and the decoded orthogonal transformation coefficients; and an inverse orthogonal transformation unit configured to output a second video signal obtained by performing an inverse orthogonal transformation on the modified orthogonal transformation coefficients, wherein the coefficient modification information is linear prediction coefficients for predicting the orthogonal transformation coefficients from the temporarily decoded orthogonal transformation coefficients, and wherein said coefficient modification unit calculates the modified orthogonal transformation coefficients from the decoded orthogonal transformation coefficients using the linear prediction coefficients.

* * * * *